US009158123B2

United States Patent
Kakubari et al.

(10) Patent No.: US 9,158,123 B2
(45) Date of Patent: Oct. 13, 2015

(54) LIGHT DIFFRACTION ELEMENT AND OPTICAL LOW PASS FILTER

(71) Applicant: ARISAWA MFG. CO., LTD., Niigata (JP)

(72) Inventors: Yuichi Kakubari, Niigata (JP); Yasuaki Umezawa, Niigata (JP); Kenichi Watabe, Niigata (JP)

(73) Assignee: ARISAWA MFG. CO., LTD., Niigata (JP)

( * ) Notice: Subject to any disclaimer, the term of this patent is extended or adjusted under 35 U.S.C. 154(b) by 154 days.

(21) Appl. No.: 14/032,197

(22) Filed: Sep. 20, 2013

(65) Prior Publication Data

US 2014/0016081 A1    Jan. 16, 2014

Related U.S. Application Data

(63) Continuation of application No. PCT/JP2012/000938, filed on Feb. 13, 2012.

(30) Foreign Application Priority Data

Mar. 25, 2011   (JP) ................................. 2011-068374
Jun. 10, 2011   (JP) ................................. 2011-129762

(51) Int. Cl.
   *G02F 1/13*        (2006.01)
   *G02B 27/42*       (2006.01)
   (Continued)

(52) U.S. Cl.
   CPC .......... *G02B 27/42* (2013.01); *B29D 11/00634* (2013.01); *G02B 5/3016* (2013.01); *G02B 27/46* (2013.01); *G02F 1/1313* (2013.01); *G02F 2001/133635* (2013.01); *G02F 2413/09* (2013.01)

(58) Field of Classification Search
   USPC ........................................................ 349/201
   See application file for complete search history.

(56) References Cited

U.S. PATENT DOCUMENTS

2009/0169126 A1* 7/2009 Masuda et al. ................. 382/255
2009/0322970 A1* 12/2009 Iwane .............................. 349/193
(Continued)

FOREIGN PATENT DOCUMENTS

JP     H10-161108 A      6/1998
WO     2008/004570 A1    1/2008
(Continued)

OTHER PUBLICATIONS

International Search Report for International Application No. PCT/JP2012/000938, issued by the Japanese Patent Office on Apr. 17, 2012.
(Continued)

*Primary Examiner* — Richard Kim
*Assistant Examiner* — Ryan Crockett

(57) ABSTRACT

A light diffraction element comprising a transparent substrate and a first orientation layer that is formed on one surface of the substrate and includes anisotropic polymers and a first pattern of an orientation direction arranged periodically in a first direction along the primary plane of the substrate. The first pattern includes three or more small regions that are arranged in the first direction and in which the orientation direction of the polymers included in the first orientation layer are different from each other, and generates diffracted light as a result of interference between light passed respectively through the three or more small regions.

25 Claims, 22 Drawing Sheets

(51) Int. Cl.
  *G02B 5/30* (2006.01)
  *G02B 27/46* (2006.01)
  *B29D 11/00* (2006.01)
  *G02F 1/13363* (2006.01)

(56) References Cited

U.S. PATENT DOCUMENTS

2010/0033657 A1* 2/2010 Choi et al. .................. 349/104
2011/0242478 A1* 10/2011 Yakushiji et al. ............ 349/193
2011/0304782 A1* 12/2011 Akao et al. .................. 349/201

FOREIGN PATENT DOCUMENTS

WO 2010/070772 A1 6/2010
WO WO/2010/070772 * 6/2010
WO 2010/095568 A1 8/2010

OTHER PUBLICATIONS

International Preliminary Report on Patentability of International Patent Application No. PCT/JP2012/000938, issued by the International Bureau of WIPO on Oct. 10, 2013.

* cited by examiner

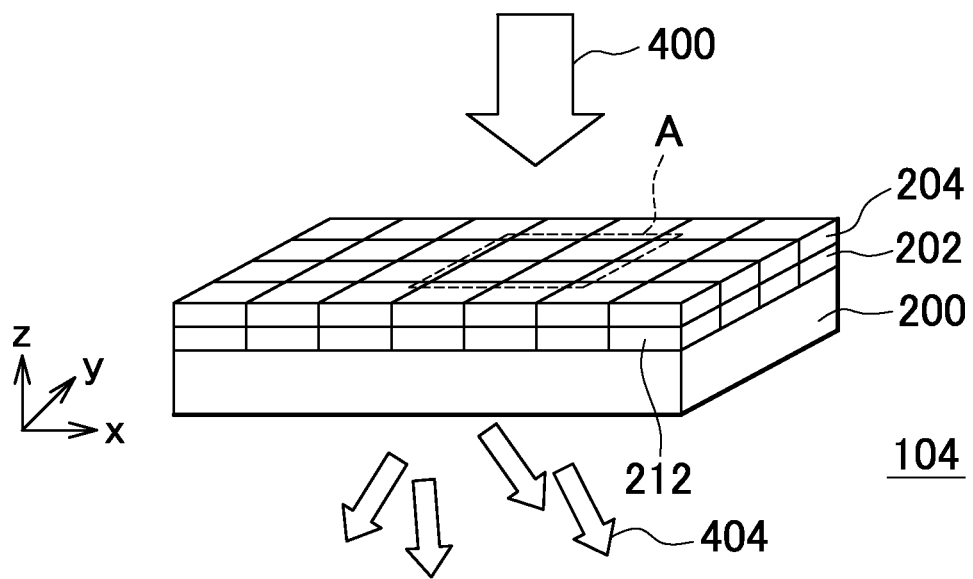
F I G . 5

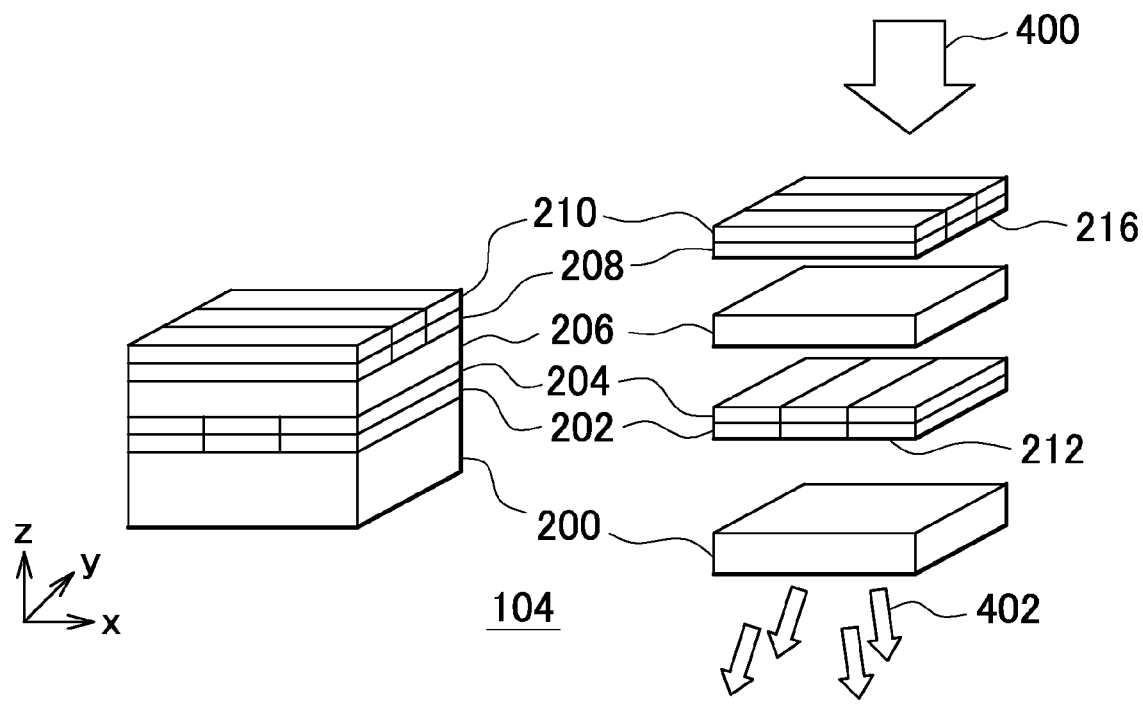
F I G . 7

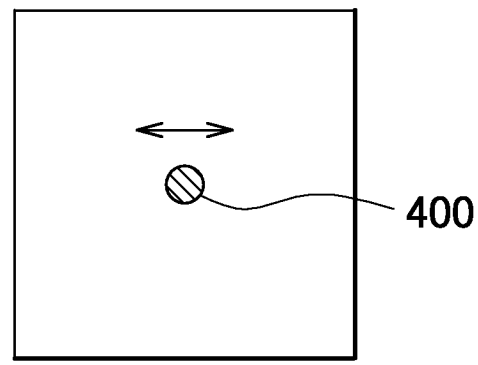
FIG. 8A
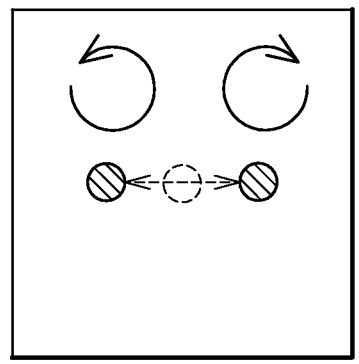
FIG. 8B
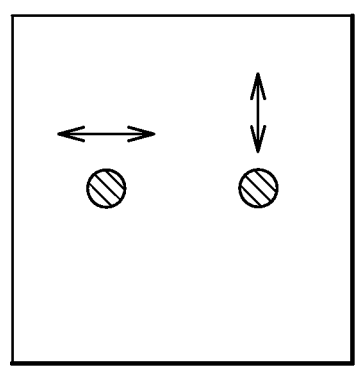
FIG. 8C
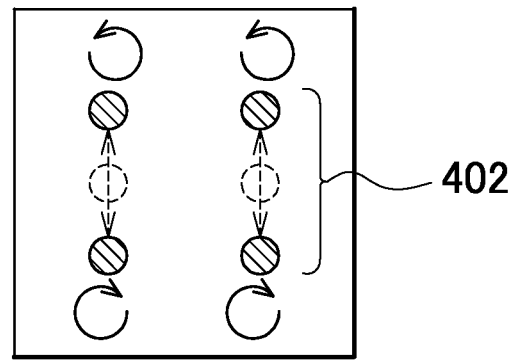
FIG. 8D
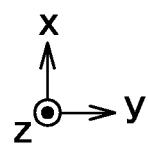

F I G. 14A
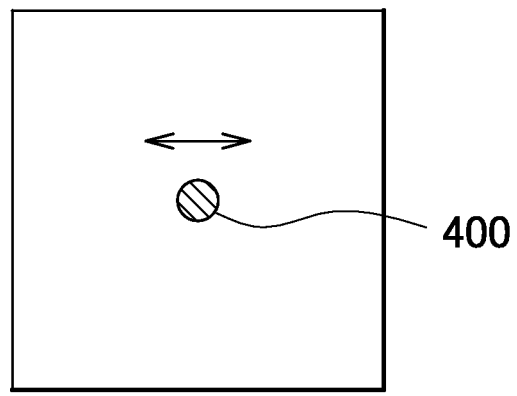
F I G. 14B
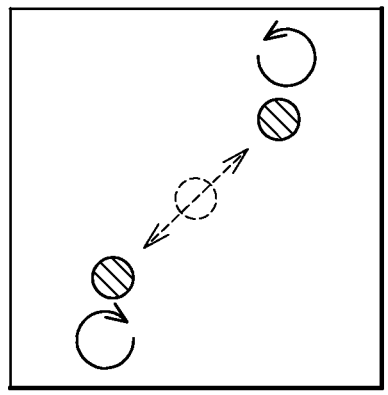
F I G. 14C
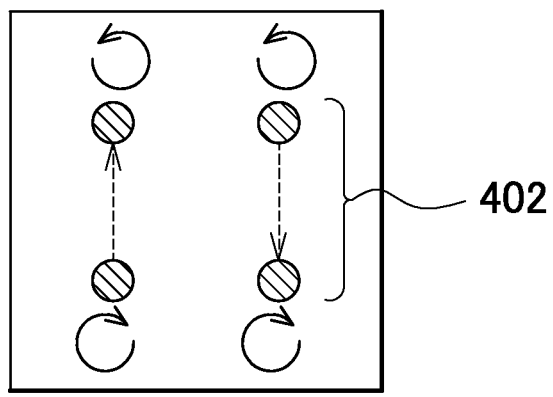
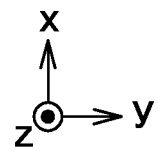

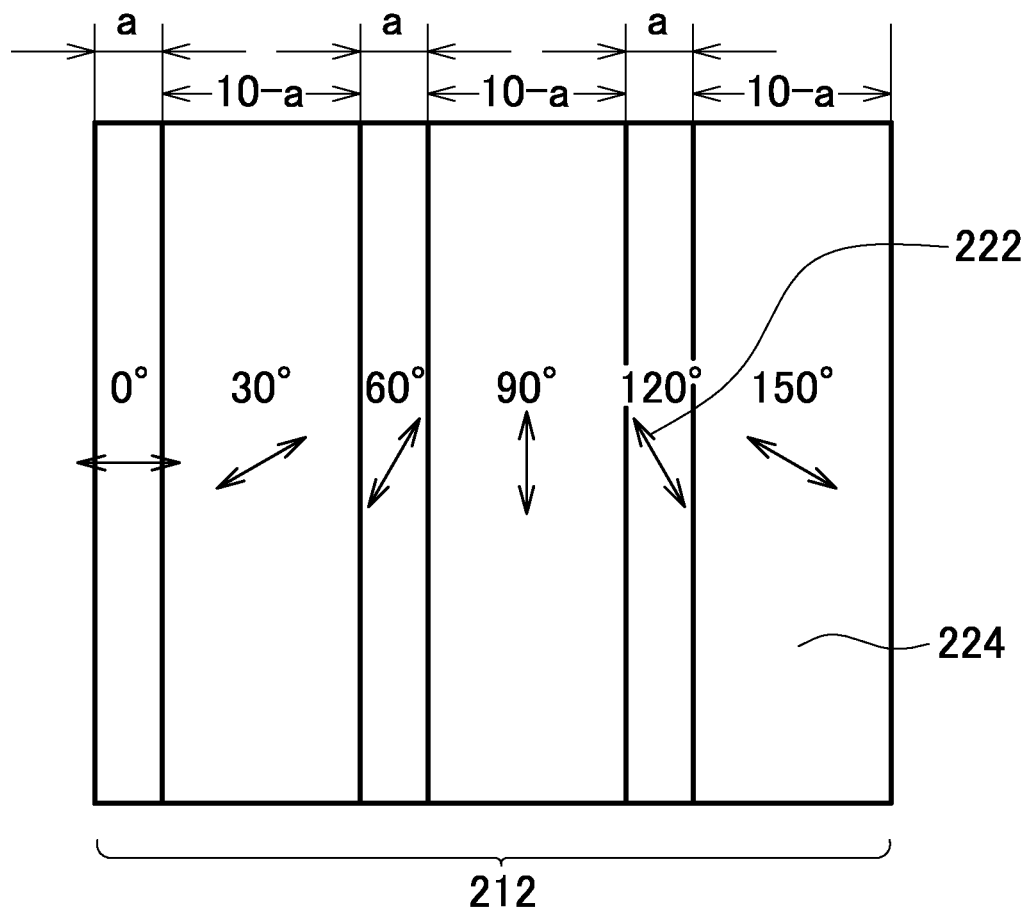
F I G . 15

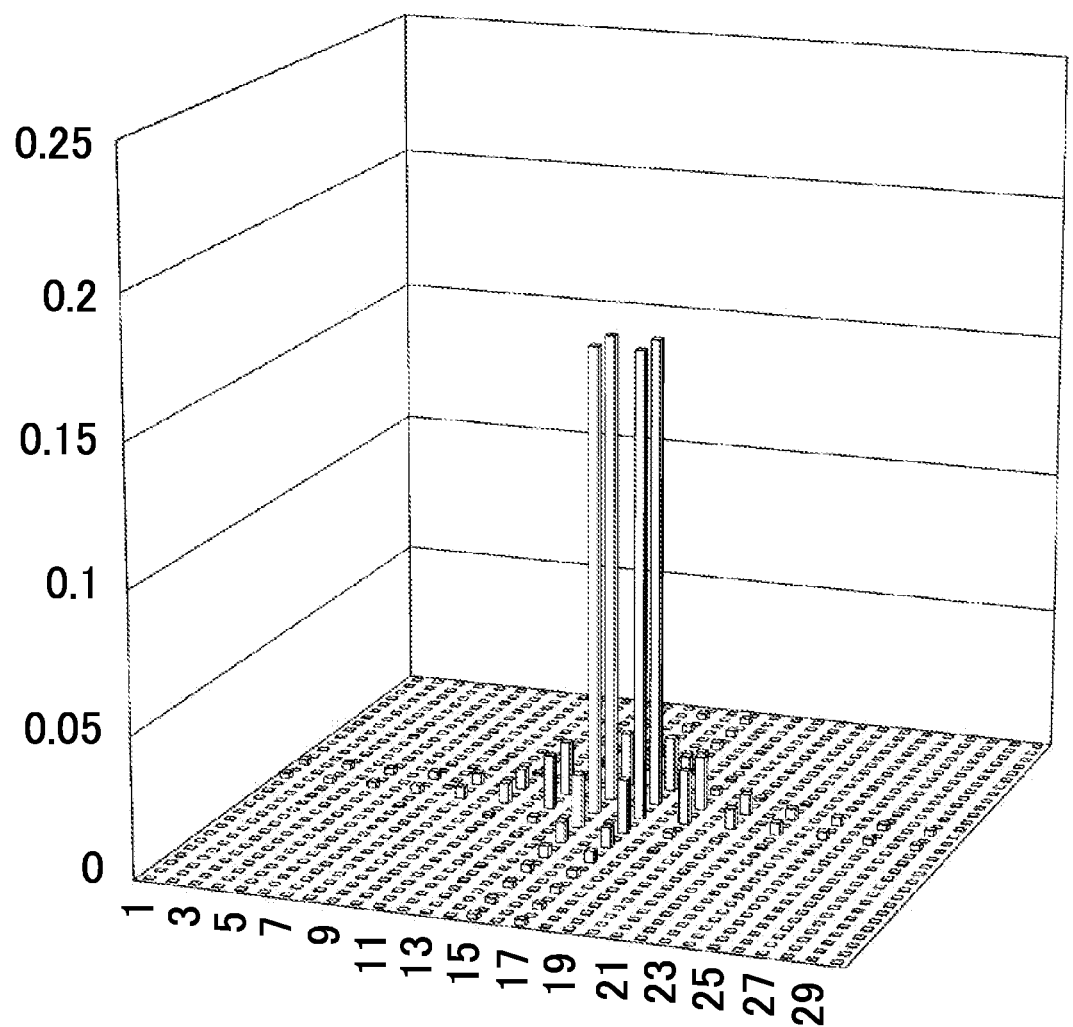
F I G. 19

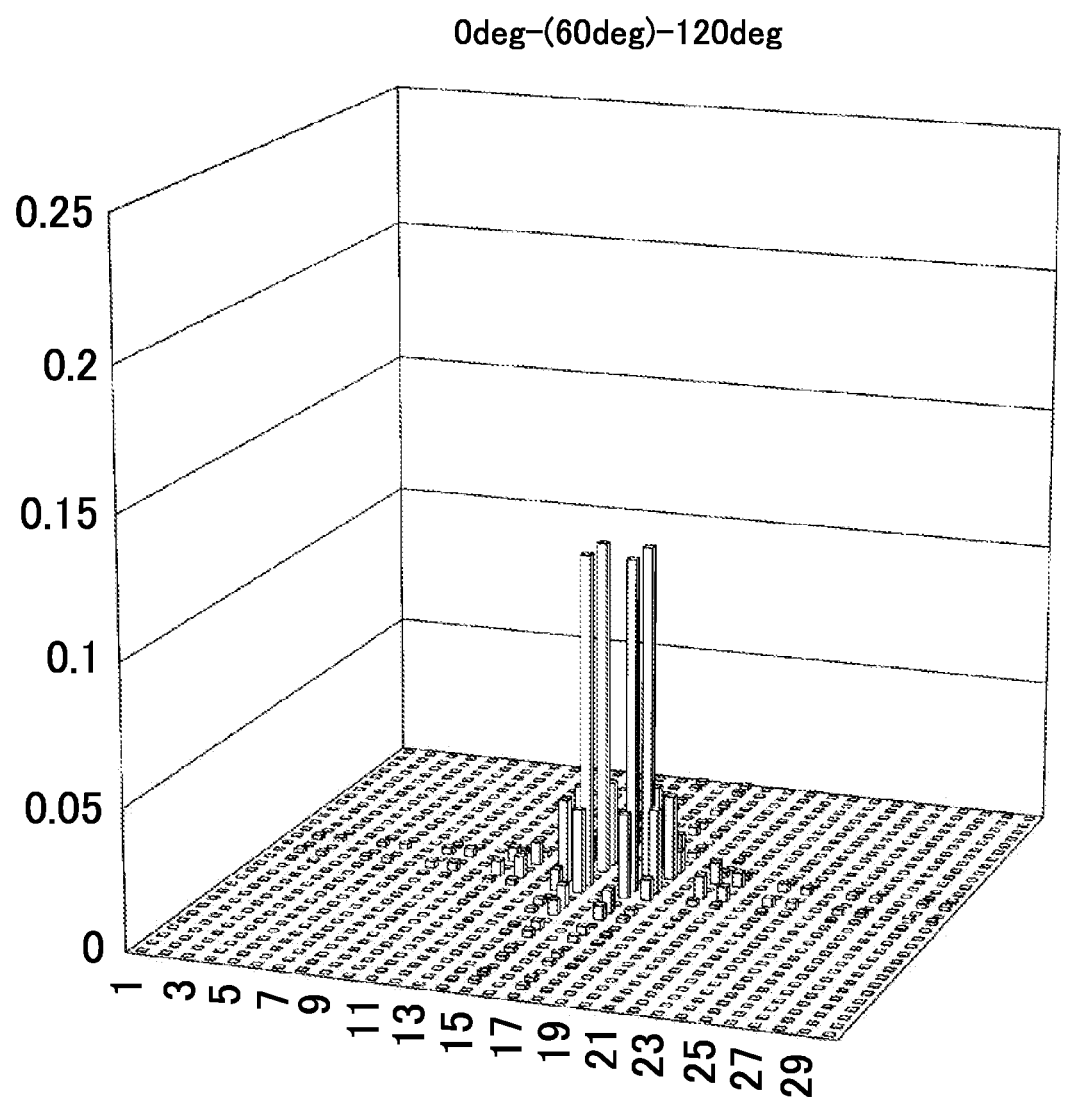
F I G . 20

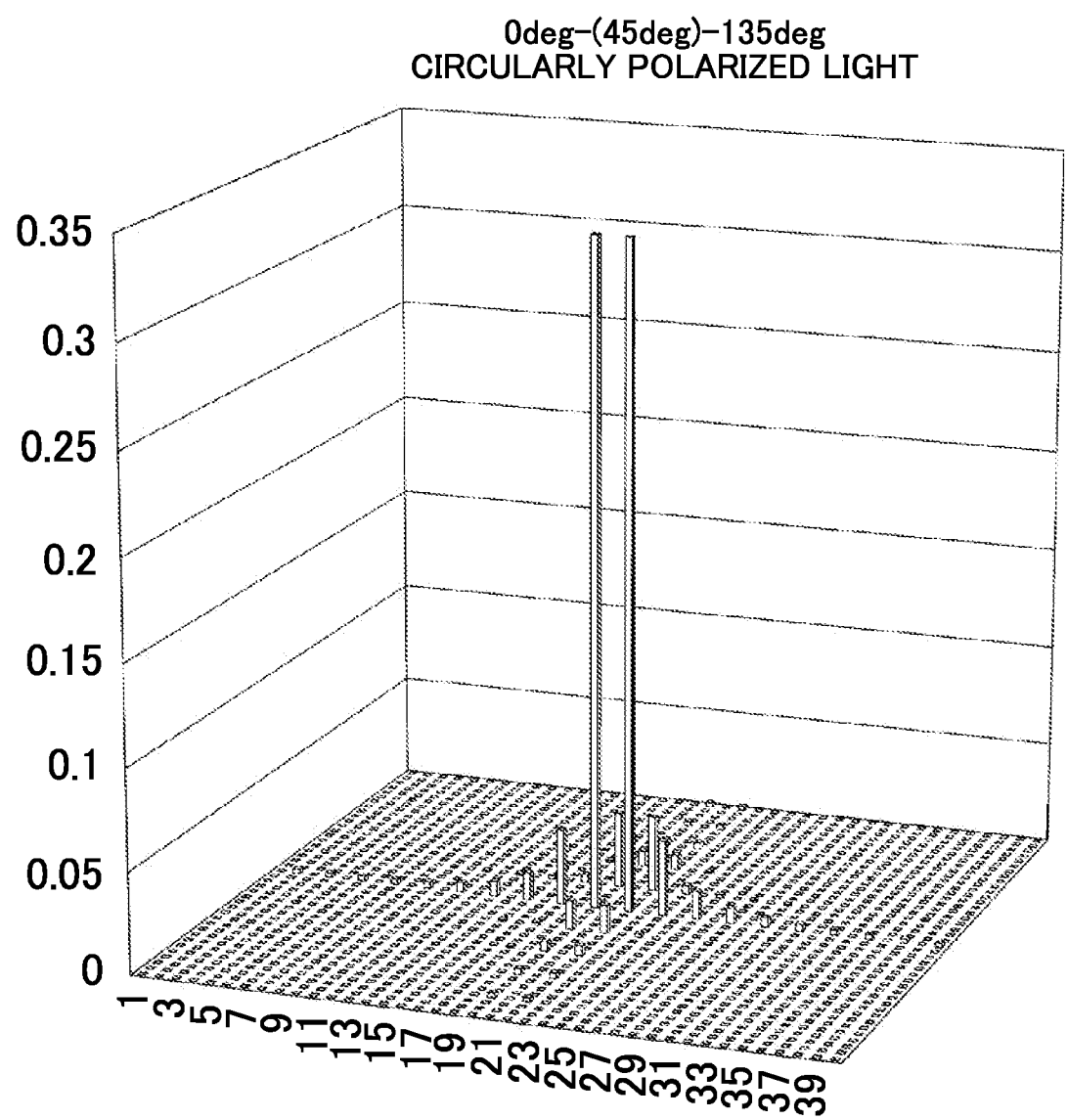
F I G . 22

LIGHT DIFFRACTION ELEMENT AND OPTICAL LOW PASS FILTER

BACKGROUND

The contents of the following Japanese patent applications and PCT application are incorporated herein by reference:
NO. 2011-068374 filed on Mar. 25, 2011,
NO. 2011-129762 filed on Jun. 10, 2011, and
NO. PCT/JP2012/000938 filed on Feb. 13, 2012.

1. Technical Field

The present invention relates to a light diffraction element and an optical low pass filter using the light diffraction element.

2. Related Art

An optical low pass filter is used for a digital movie or digital camera using an image capturing element in order to prevent Moire patterns caused by input of an optical image having a spatial frequency higher than the pixel pitch of the image capturing element. A liquid crystal board utilizing birefringence of a material is used as an optical low pass filter, as shown in Patent Document 1.

Patent Document 1: International Publication No. 2008/004570

However, a light diffraction element using a crystal board has an increased thickness, and is therefore difficult to miniaturize. Furthermore, a crystal board is expensive, and easily attracts debris due to its charge.

SUMMARY

Therefore, it is an object of an aspect of the innovations herein to provide a light diffraction element and an optical low pass filter, which are capable of overcoming the above drawbacks accompanying the related art. The above and other objects can be achieved by combinations described in the claims.

According to a first aspect of the present invention, provided is a light diffraction element comprising a transparent substrate and a first orientation layer that is formed on one surface of the substrate and includes anisotropic polymers and a first pattern of an orientation direction arranged periodically in a first direction along the primary plane of the substrate. The first pattern includes three or more small regions that are arranged in the first direction and in which the orientation direction of the polymers included in the first orientation layer are different from each other, and generates diffracted light as a result of interference between light passed respectively through the three or more small regions.

According to a second aspect of the present invention, provided is a light diffraction element comprising a transparent substrate and a first orientation layer that is formed on one surface of the substrate and includes anisotropic polymers and a first pattern of an orientation direction arranged periodically in a first direction along the primary plane of the substrate. The first pattern is formed to have an orientation direction that changes while moving in the first direction, and generates diffracted light as a result of interference between light passed through the first pattern.

According to a third aspect of the present invention, provided is an optical low pass filter that uses the light diffraction element described above.

The summary clause does not necessarily describe all necessary features of the embodiments of the present invention. The present invention may also be a sub-combination of the features described above.

BRIEF DESCRIPTION OF THE DRAWINGS

FIG. 5 is a schematic view of a third embodiment of the light diffraction element.
FIG. 7 is a schematic view of a fourth embodiment of the light diffraction element.
FIG. 8A is a schematic view of diffraction of the light incident to the light diffraction element of FIG. 7.
FIG. 8B is a schematic view of diffraction of the light incident to the light diffraction element of FIG. 7.
FIG. 8C is a schematic view of diffraction of the light incident to the light diffraction element of FIG. 7.
FIG. 8D is a schematic view of diffraction of the light incident to the light diffraction element of FIG. 7.
FIG. 14A is a schematic view of diffraction of the light incident to the light diffraction element 304.
FIG. 14B is a schematic view of diffraction of the light incident to the light diffraction element 304.
FIG. 14C is a schematic view of diffraction of the light incident to the light diffraction element 304.
FIG. 15 describes the widths of the small regions.
FIG. 19 is a graph showing the diffracted light intensity in a case where the first pattern is divided into four small regions.
FIG. 20 is a graph showing the diffracted light intensity in a case where the first pattern is divided into three small regions.

FIG. 22 shows the diffracted light intensity in a case where circularly polarized light is incident to the light diffraction element of FIG. 7.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
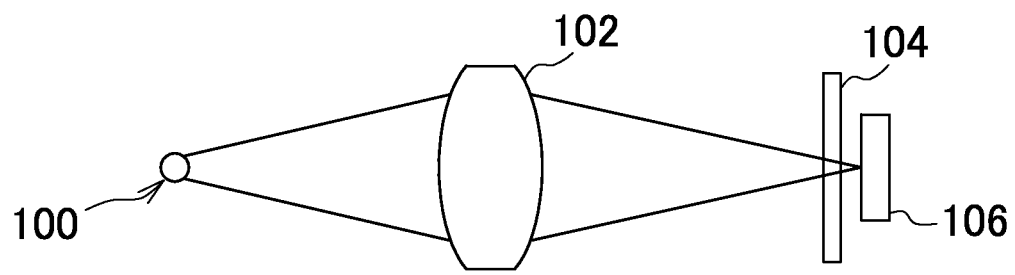
FIG. 1 schematically shows an image capturing apparatus.

FIG. 1 schematically shows an image capturing apparatus such as a digital camera. The image capturing apparatus includes an optical system 102 that focuses light from an object point 100 and an image capturing element 106 that converts the image light focused by the optical system 102 into an electrical signal and outputs the electrical signal. A plurality of image sensors are arranged periodically and two-dimensionally in the image capturing element 106. A light diffraction element 104, which is an example of a low pass filter, is arranged between the image capturing element 106 and the optical system 102.

Figure 2:
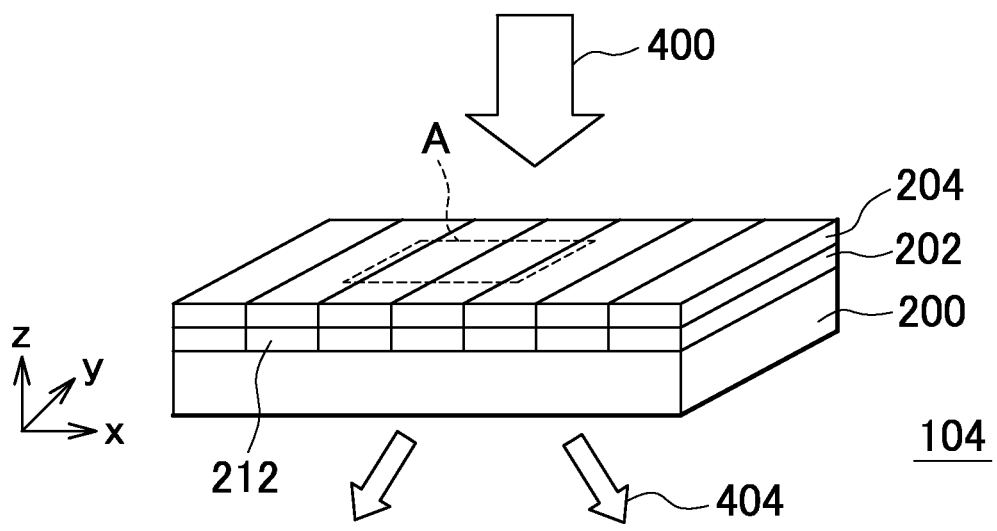
FIG. 2 is a schematic view of a first embodiment of the light diffraction element.

FIG. 2 is a schematic view of a first embodiment of the light diffraction element 104. The light diffraction element 104 includes a transparent substrate 200, a first orientation layer 202 arranged on one surface of the substrate 200, and a first liquid crystal layer 204 arranged on the top surface of the first orientation layer 202.

The substrate 200 has an overall substantially uniform thickness. For example, the substrate 200 may be formed as a rectangle with dimensions of 2 mm to 5 mm by 2 mm to 5 mm. A transparent glass substrate with a high transmittance for visible light wavelengths can be used as the substrate 200. The substrate 200 may be formed by transparent material such as resin material including a board made of resin, a film made of resin, or glass fiber.

The first orientation layer 202 is formed by an anisotropic polymer. In the first orientation layer 202, a first pattern 212, which is a polymer arrangement pattern, is repeatedly arranged periodically in the ±x direction along the primary plane of the substrate 200. The width of each first pattern 212 in the ±x direction can be set as needed such that predetermined diffracted light is generated from the incident light, and can be set to a value from 0.5 µm to 1000 µm, for example. Here, the property of being anisotropic includes both having an anisotropic optical refractive index and having an anisotropic optical absorption rate.

Figure 3:
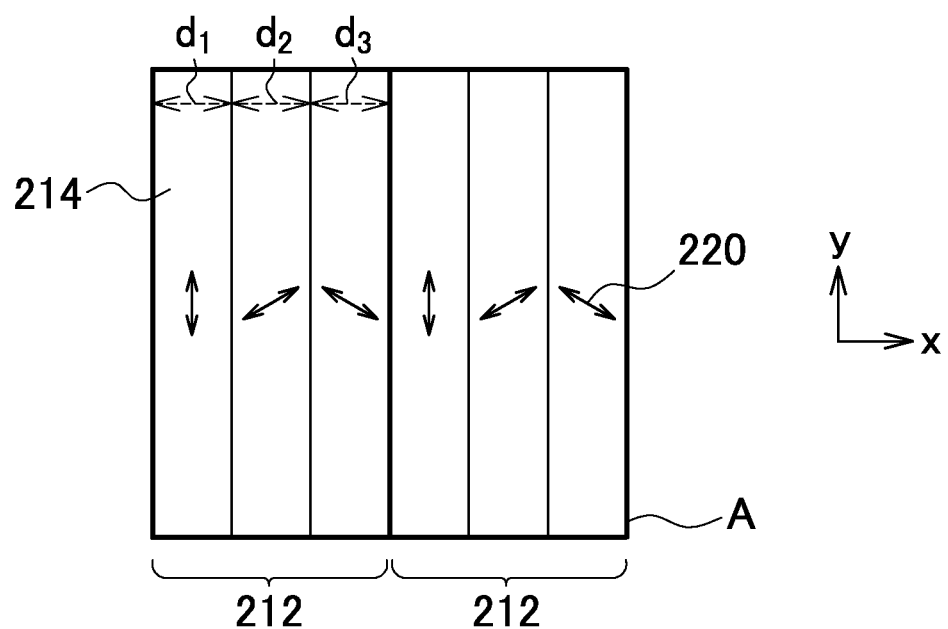
FIG. 3 is an enlarged view of the region A shown in FIG. 2.

FIG. 3 shows a state in which the polymers of the first pattern 212 are arranged in the region A shown in FIG. 2. When focusing on one first pattern 212, the first pattern 212 is divided into three small regions 214 arranged in the ±x direction. The direction in which the three small regions 214 are lined up is the same as the direction in which the first patterns 212 are line up, and therefore a plurality of small regions 214 in which the orientation direction of the polymers changes periodically are arranged periodically in the ±x direction. In FIG. 3, the widths d1, d2, and d3 of the small regions 214 in the ±x direction are the same.

In the small regions 214, the polymers are arranged with a prescribed orientation direction 220, and the polymers in adjacent small regions 214 have different orientation directions 220 from each other. In the example shown in FIG. 3, the orientation directions of adjacent small regions 214 differ by 60 degrees.

The polymers of the small regions 214 are not particularly limited, as long as they are formed of a material whose orientation can be controlled, and may be light-reactive liquid crystal compounds or light orienting compounds such as light-splitting, optical double-quantum, or optical anisotropic type compounds. After these compounds are oriented in a predetermined direction, the compounds may be hardened by light or heat to fix the orientation direction. The same material may be used as the polymers for the entire first orientation layer 202, or different polymers may be used for each small region 214.

The first liquid crystal layer 204 on the small region 214 is oriented in the orientation direction 220 of the small region 214. In other words, the first liquid crystal layer 204 is oriented in the orientation direction of the first orientation layer 202 that is directly below the first liquid crystal layer 204. In this way, the first liquid crystal layer 204 has a pattern in which the direction of the retardance axis of the birefringence is arranged periodically according to the orientation of the first orientation layer 202. By periodically changing the direction of the retardance axis according to the position, the first liquid crystal layer 204 functions as a phase diffraction grating. Polymeric liquid crystal formed by optical or thermal polymerization may be used as the first liquid crystal layer 204. The first liquid crystal layer 204 has a thickness of approximately 0.01 µm to 1 µm, for example. The same crystal material may be used for the entire first liquid crystal layer 204, or different liquid crystal material may be used for each region corresponding to a small region 214.

The total of the retardation of the first orientation layer 202 and the retardation of the first liquid crystal layer 204 is a ½ wavelength, for example.

In the light diffraction element 104 described above, the incident light 400 that is incident from the +z direction in FIG. 2 passes through the light diffraction element 104, thereby generating first-order diffracted light 404 that has an angle in the ±x direction relative to the ±z direction. Only the first-order diffracted light is shown in FIG. 2, but there can also be embodiments in which zero-order diffracted light or diffracted light of the second order or higher is generated.

As described above, in the light diffraction element 104, the first orientation layer 202 includes small regions 214 with different orientations from each other and the first liquid crystal layer 204 includes regions corresponding to the small regions 214, and therefore the lights passed through these small regions 214 interfere with each other to create diffracted light. Furthermore, in the first orientation layer 202, the first pattern 212 formed by the small regions 214 is repeated and the first liquid crystal layer 204 has a region corresponding to the repeating first pattern 212, and therefore the intensity of the diffracted light can be improved. Yet further, by setting the same angular difference between orientation directions 220 in adjacent small regions 214, the intensity ratio of the first-order diffracted light can be improved. When the orientation direction 220 of each first pattern 212 is rotated once or approximately once in the primary plane of the substrate 200, the intensity ratio of the first-order diffracted light can be increased. By setting the widths d1, d2, and d3 of the small regions 214 to be the same, the intensity ratio of the first-order diffracted light can be increased.

If the diffracted light can be created using only the first orientation layer 202, there is no need to provide the first liquid crystal layer 204. In this case, by orienting the retardance axes or absorption axes of the polymers in the small region 214 in a prescribed direction in the small regions 214, the refractive index anisotropy within the surface or refractive index anisotropy in the thickness direction can be realized. In the example shown in FIG. 2, the thickness of the first orientation layer 202 is in the order of nanometers, and therefore anisotropy is not realized or is barely realized by the first orientation layer 202 itself, but anisotropy can be realized by increasing the thickness of the first orientation layer 202. In this way, by periodically changing the orientation direction of the retardance axes or the absorption axes depending on the position, the first orientation layer 202 itself can function as a diffraction grating.

FIG. 3 shows an example in which the small regions 214 are rectangular, but the shape of the small regions 214 is not limited to this. As another example, the small regions 214 may be triangular or hexagonal, for example. In FIG. 3, the small regions 214 in each first pattern 212 have the same widths as each other, but these widths may instead be different.

The orientation direction of each region in the small regions 214 is changed by rotating the orientation direction 220 of the polymers of the small regions 214 in the primary plane of the substrate 200 in FIG. 3, but the orientation direction may instead be changed by changing the thickness of each region of the small regions 214. As another example, the polymer tilt angle of each small region 214 may be changed. As yet another example, the thickness of the first liquid crystal layer 204 formed on the small regions 214 may be changed in each region and the tilt angle of the liquid crystal molecules may be changed in each region.

With the embodiment described above, the light diffraction element 104 uses the first orientation layer 202 and the first liquid crystal layer 204, and can therefore be miniaturized. Furthermore, since there is no need to form bumps or depressions on the substrate 200 or the like, the flatness of the light diffraction element 104 can be improved. As a result, the light diffraction element 104 can achieve a sufficient aberration in the surface transmitting the wave, without providing cover glass or the like. Furthermore, since there is no need to form bumps or depressions on the substrate 200, the effects of debris such as dust is reduced. As a result, maintenance is easier, manufacturability is improved, and the deterioration of optical characteristics caused by dust or the like can be restricted in the light diffraction element 104.

Figure 4:
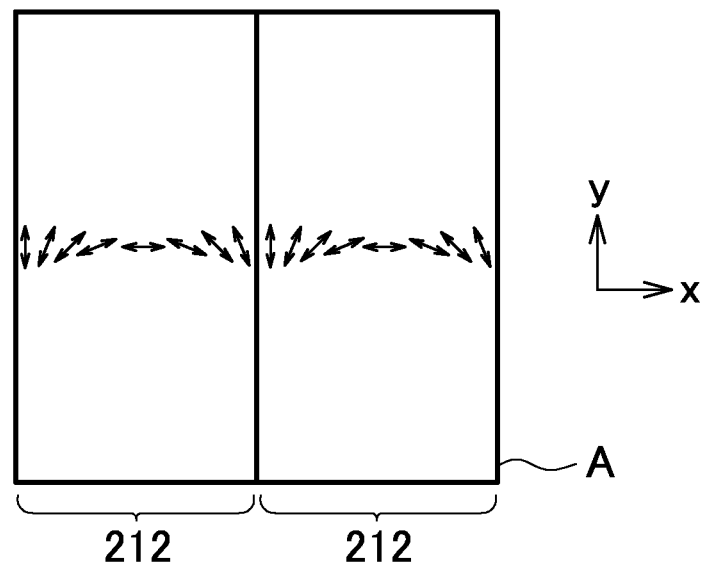
FIG. 4 is an enlarged view of the region A in the light diffraction element according to a second embodiment of the light diffraction element.

FIG. 4 shows a second embodiment of the light diffraction element 104. The present embodiment is the same as the first embodiment, except with respect to the orientation pattern of the first pattern 212. Components that are the same as those in the first embodiment are given the same reference numerals, and redundant descriptions are omitted.

In FIG. 4, the first pattern 212 is shown by two regions A arranged in the ±x direction. Focusing on one of the first patterns 212, the first orientation layer 202 is provided such that the orientation direction of a series of polymers is different in the ±x direction. The orientation directions of the polymers arranged along the ±y direction, which is orthogonal to the ±x direction in the primary plane, are substantially the same.

The directions to which the orientation direction of the polymers are changed is the same ±x direction as the arrangement direction of the first pattern 212. Furthermore, the orientation direction changes smoothly at the border between first patterns. In the overall light diffraction element 104 of the present embodiment, the orientation direction of the polymers changes periodically in a continuous manner in the ±x direction.

The polymer orientation direction is rotated by 180° in each one of the first patterns 212. By rotating the orientation direction by 180° in the primary plane of the substrate 200 for each first pattern, the intensity ratio of the first-order diffracted light can be improved. This is because the light interference effect enables the first-order diffracted light to be efficiently output.

In the present embodiment, the orientation direction in the first pattern 212 is changed by rotating the orientation direction of the polymers of the first patterns 212 within the primary plane of the substrate 200 shown in FIG. 4, but instead, the orientation direction may be changed by changing the thicknesses of each first pattern 212. As another example, the polymer tilt angle may be changed in each first pattern 212.

In the present embodiment, the total of the retardation of the first orientation layer 202 and the retardation of the first liquid crystal layer 204 is a ½ wavelength, for example.

FIG. 5 is a schematic view of a third embodiment of the light diffraction element 104. The light diffraction element 104 includes a transparent substrate 200, a first orientation layer 202 arranged on one surface of the substrate 200, and a first liquid crystal layer 204 formed on the top surface of the first orientation layer 202. The light diffraction element 104 of FIG. 5 differs from the light diffraction element 104 of FIGS. 1 to 3 with respect to the orientation patterns of the first orientation layer 202 and the first liquid crystal layer 204, and the remaining configuration is the same. Therefore, redundant descriptions are omitted.

A plurality of orientation patterns of the first orientation layer 202 and the first liquid crystal layer 204 in FIG. 5 are arranged periodically within the primary plane of the substrate in both the ±x direction and the ±y direction. The ±x direction and the ±y direction are not particularly limited, as long as these directions are not the same. In this case, the incident light 400 becomes first-order diffracted light 404 that is distanced in four or more directions.

Figure 6:
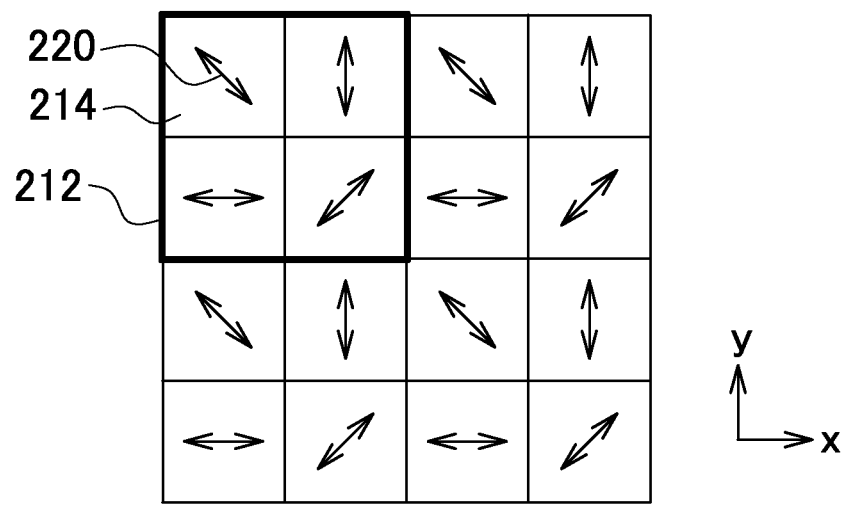
FIG. 6 is an enlarged view of the region A shown in FIG. 5.

FIG. 6 shows a state of the orientation of the polymers of the first patterns 212 in the first orientation layer 202 in region A shown in FIG. 5. In FIG. 6, the first patterns 212 are arranged in a 2×2 formation in the x direction and the ±y direction. Focusing on one first pattern 212, the first pattern 212 is divided into four small regions 214 arranged in a 2×2 formation in the ±x direction and the ±y direction. By arranging these four small regions 214 with the same arrangement direction as the first pattern 212 in both the ±x direction and the ±y direction, the light diffraction element 104 of the present embodiment has all of the small regions 214 with polymer orientation directions repeated periodically in the ±x direction and the ±y direction.

In a single first pattern 212, the orientation direction 220 is different for adjacent small regions 214. For example, the four small regions 214 included in one first pattern 212 are arranged such that the orientation directions 220 thereof are rotated once. In the example of FIG. 6, the orientation directions 220 of the four small regions 214 are sequentially rotated by 45° clockwise (or counter-clockwise), resulting in a rotation of 180° within the first orientation layer 202. The orientation direction 220 is within the primary plane of the substrate 200.

By changing the orientation direction 220 such that the angle difference between adjacent small regions 214 adjacent clockwise or counter-clockwise in the ±y direction is the same, the intensity ratio of the first-order diffracted light can be improved.

The first liquid crystal layer 204 is arranged in the orientation direction of the first orientation layer 202 located directly therebelow. In other words, the liquid crystal molecules in the first liquid crystal layer 204 are oriented according to the first pattern 212 of the first orientation layer 202, in each region of the matrix pattern formation.

In the light diffraction element 104 described above, the incident light 400 that is incident from the positive ±z direction in FIG. 5 passes through the light diffraction element 104 to create first-order diffracted light 404 separated into four directions including first-order diffracted light 404 having an angle in the ±x direction relative to the ±z direction and first-order diffracted light 404 having an angle in the ±y direction relative to the ±z direction. Only the first-order diffracted light is shown in FIG. 5, but there can also be embodiments in which zero-order diffracted light or diffracted light of the second order or higher is generated. If the diffracted light can be created using only the first orientation layer 202, there is no need to provide the first liquid crystal layer 204.

In the example of FIG. 6, each first pattern 212 has four small regions 214 with different orientations arranged therein, but each first pattern 212 may instead include small regions 214 with three types or five or more types of orientations. Furthermore, the shape and size of the small regions 214 may be changed as needed, in the same manner as in the light diffraction element 104 of FIG. 3.

In FIG. 6, the birefringence in the surface of each region of the small regions 214 is changed by rotating the orientation direction 220 within the primary plane of the substrate 200, but instead anisotropy may be caused in the thickness direction of each region of the small regions 214.

With the embodiment described above, since the first orientation layer 202 and the first liquid crystal layer 204 used have orientation directions that change periodically in the ±x direction and the ±y direction, the light diffraction element 104 can be miniaturized and the diffracted light separated into directions orthogonal to each other in the surface of the substrate 200 can be output.

The left side of FIG. 7 is a schematic view of a fourth embodiment of the light diffraction element 104. The right side of FIG. 7 is a schematic view obtained by separating each component of the light diffraction element 104 shown on the left side into individual layers, for ease of description.

The light diffraction element 104 shown in FIG. 7 includes a transparent substrate 200, a first orientation layer 202 arranged on one surface of the substrate 200, and a first liquid crystal layer 204 arranged on the top surface of the first orientation layer 202, in the same manner as the light diffraction element 104 shown in FIGS. 2 and 3. In the light diffraction element 104 shown in FIG. 7, a retardation layer 206 is formed on the top surface of the first liquid crystal layer 204, a second orientation layer 208 is formed on the top surface of the retardation layer 206, and a second liquid crystal layer 210 is formed on the top surface of the second orientation layer 208. The retardation layer 206 may be, instead of a single layer, a plurality of layers including an orientation film, for example.

The first orientation layer 202 includes anisotropic polymers. The second orientation layer 208 includes anisotropic polymers that are the same as or different from those included in the first orientation layer 202. These anisotropic polymers are oriented with a periodic pattern in the first orientation layer 202 and the second orientation layer 208. In the same manner as the first to third embodiments, a plurality of first patterns 212 formed of small regions defining a minimum unit region of an orientation pattern are formed in the first orientation layer 202 and these first patterns 212 are arranged periodically in the ±x direction, which is a first direction, along the primary plane of the substrate 200. In the second orientation layer 208, second patterns 216 formed of small regions defining a minimum unit region of an orientation pattern are arranged periodically in the ±y direction, which is a second direction intersecting the first direction, along the primary plane of the substrate.

The ±x direction and the ±y direction are not particularly limited, as long as these directions are not the same, and can be orthogonal to each other, for example. By setting the ±x direction and the ±y direction to be orthogonal, the first-order diffracted light can be separated into four or more directions.

The first pattern of the first orientation layer 202 and the second pattern of the second orientation layer 208 can be formed to be the same as the first pattern 212 described above in the first to third embodiments. The second pattern can be formed by switching the first direction with the second direction in the first pattern described above in the first to third embodiments.

The first liquid crystal layer 204 is oriented according to the orientation direction of the first orientation layer 202 located directly therebelow. The first liquid crystal layer 204 is oriented in a pattern corresponding to the first pattern of the first orientation layer 202. The total of the retardation of the first orientation layer 202 and the retardation of the first liquid crystal layer 204 is a ½ wavelength, for example.

The retardation layer 206 converts the circularly polarized diffracted light emitted from the second pattern 216 into linearly polarized light. A ¼ wavelength retardation layer, for example, can be used as the retardation layer 206. A ¼ wavelength plate converts the linearly polarized light into circularly polarized light, and also converts circularly polarized light into linearly polarized light. The ¼ wavelength plate preferably has positive wavelength dispersion characteristics, in order to decrease the effect of diffracted light intensity distribution caused by color. For example, the retardation layer 206 having positive waveform dispersion characteristics (inverse dispersion) can be formed by layering a plurality of layers with different optical axes and phase differences. The retardation layer 206 can have a thickness of approximately 0.01 µm to 5 µm, for example.

The retardation layer 206 can be formed by causing a variety of liquid crystals to have prescribed orientations. For example, a liquid crystal layer can be formed by forming an orientation film using a method of optical orientation of rubbing in advance and then applying birefringent liquid crystal (e.g. a material used above when describing the first liquid crystal layer), and the resulting liquid crystal layer can be used as the retardation layer 206. If polymeric liquid crystal is used as the liquid crystal, the polymerization reaction progresses due to light or heat, thereby hardening the liquid crystal.

The retardation layer may be formed by transposing and affixing a ¼ wavelength plate prepared in advance as a sheet onto the first orientation layer or onto liquid crystal provided on the first orientation layer through a method such as lamination.

The second liquid crystal layer 210 is oriented in the orientation direction of the second orientation layer 208 located directly therebelow. The second liquid crystal layer 210 is oriented with a pattern corresponding to the second pattern of the second orientation layer 208. The total of the retardation of the second orientation layer 208 and the retardation of the second liquid crystal layer 210 is a ½ wavelength, for example. The first liquid crystal layer 204 located above different first patterns 212 and the second liquid crystal layer 210 located above different second patterns 216 can include liquid crystal having the same composition but different orientation directions.

Figure 9:
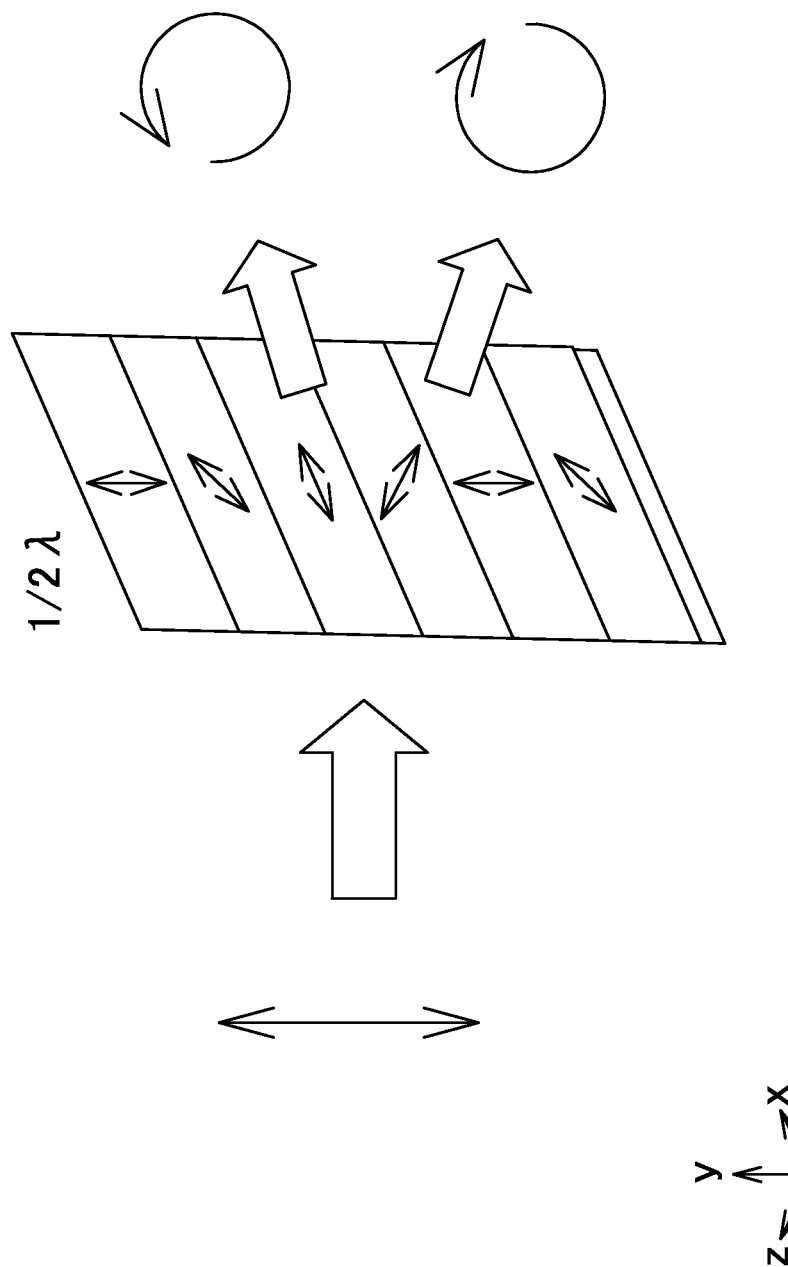
FIG. 9 shows a relationship between the diffraction direction and the polarization state of light incident to each of the first liquid crystal layer and the second liquid crystal layer.

FIGS. 8A to 8D are schematic views of diffraction of the light incident to the light diffraction element 104 of FIG. 7. FIG. 9 shows a relationship between the diffraction direction and the polarization state of light incident to each of the first liquid crystal layer 204 and the second liquid crystal layer 210, in a case where the first liquid crystal layer 204 and the second liquid crystal layer 210 have a retardation of a ½ wavelength.

FIG. 8A shows the incident light 400 that is incident to the −z direction (the direction into the plane of the drawing) from the +z direction (the direction coming from the plane of the drawing), for the light diffraction element 104 shown in FIG. 7. The incident light 400 is linearly polarized light that is polarized in the ±y direction, for example, and is a single light beam. The incident light 400 may be linearly polarized light that has another polarization direction within the xy plane. The incident light 400 is incident to the second liquid crystal layer 210 and the second orientation layer 208 of the light diffraction element 104.

FIG. 8B shows the light resulting from the incident light 400 passing through the second liquid crystal layer 210 and the second orientation layer 208. As shown in FIG. 9, the linearly polarized light beam incident to the second liquid crystal layer 210 is converted into two beams of circularly polarized light that have different polarization directions from each other and are in the direction of the repeating pattern, i.e. the ±y direction in FIG. 9. The circularly polarized light divided into two beams is incident to the retardation layer 206 of the light diffraction element 104.

FIG. 8C shows the light resulting from the two circularly polarized beams passing through the retardation layer 206. The ¼ wavelength retardation plate converts the circularly polarized light into linearly polarized light. Accordingly, the two beams of circularly polarized light incident to the retardation layer 206 are converted into two beams of linearly polarized light.

FIG. 8D shows the light resulting from the two beams of linearly polarized light passing through the first liquid crystal layer 204 and the first orientation layer 202. As shown in FIG. 9, the linearly polarized light incident to the first liquid crystal layer 204 split into circularly polarized light beams having different polarization rotation directions from each other. Accordingly, the two beams of linearly polarized light incident to the first liquid crystal layer 204 and the first orientation layer 202 become linearly polarized light split into four beams in the direction of the repeating pattern, i.e. the ±x direction in FIG. 9. The circularly polarized light split into four beams is emitted from the substrate 200.

In this way, the light diffraction element generates diffracted light in the ±x direction and the ±y direction by passing the incident light 400 through the second liquid crystal layer 210, the second orientation layer 208, the retardation layer 206, the first liquid crystal layer 204, and the first orientation layer 202. FIGS. 7 to 9 show only the first-order diffracted light, but there can also be embodiments in which zero-order diffracted light or diffracted light of the second order or higher is generated. If the diffracted light can be created using only the first orientation layer 202, there is no need to provide the first liquid crystal layer 204. If the diffracted light can be created using only the second orientation layer 208, there is no need to provide the second liquid crystal layer 210.

In the present embodiment, the widths of the first liquid crystal layer 204 and the first pattern 212 in the first direction are the same as the widths of the second liquid crystal layer 210 and the second pattern 216 in the second direction. Since the widths of the first pattern and the second pattern and the distance by which the first-order diffracted light beams are separated from each other have a relationship that is approximately inversely proportionate, the light diffraction element 104 can output diffracted light beams that are separated to be positioned at the vertices of a substantially square shape.

If the light diffraction element 104 does not include the retardation layer 206, the circularly polarized diffracted light beams passed through the second liquid crystal layer 210 and the second orientation layer 208 are not sufficiently split by the first liquid crystal layer 204 and the first orientation layer 202, which results in diffracted light split into two beams being emitted, but in this case the light diffraction element 104 still functions as a light diffraction element.

In the embodiment shown in FIGS. 7 to 9, the incident light 400 is incident to the second orientation layer 208 from the +z direction in the plane of the drawing and the emitted light 402 is emitted from the first orientation layer 202 in the −z direction, but the same effect can be achieved when the incident light 400 and the emitted light 402 are in opposite directions. In the above description, the first orientation layer 202, the first liquid crystal layer 204, the retardation layer 206, the second orientation layer 208, and the second liquid crystal layer 210 are formed on the substrate 200 sequentially in the stated order, but instead the first orientation layer 202 and the first liquid crystal layer 204 may be provided on one side of the substrate 200 while the second orientation layer 208 and the second liquid crystal layer 210 are formed on the other side. In this case, the retardation layer 206 can be formed on either of the surfaces of the substrate 200, such that the retardation layer 206 is between the first orientation layer 202 and the second orientation layer 208.

With the embodiment described above, a simple configuration can be used to achieve the same effect as the embodiment described in FIG. 5. Furthermore, since the retardation layer 206 is provided between the first liquid crystal layer 204 and the second orientation layer 208, the first-order diffracted light can be emitted being split into four beams having approximately the same intensity. In the embodiments described in FIGS. 2 to 7, the ±x direction is the first direction and the ±y direction is the second direction that is orthogonal to the ±x direction, but the first direction and the second direction need not be orthogonal to each other.

FIG. 10 is a schematic view for describing the manufacturing process of the light diffraction element 104 shown in FIG. 7. First, on one surface of the substrate 200, a light orienting compound is applied using a roll coater, a spin coater, or a slit die coater, for example, and the first orientation layer 202 is formed by performing a suitable amount of drying. FIG. 10A shows the substrate 200 and the first orientation layer 202 formed on the substrate 200 in this manner.

Figure 10A:
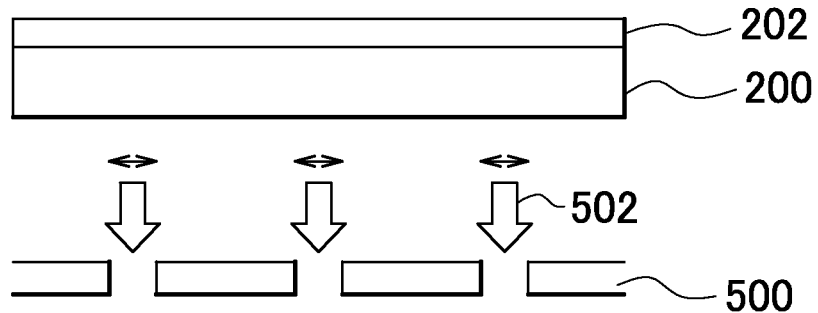
FIG. 10A shows a step in the manufacturing process of the light diffraction element.
Figure 10B:
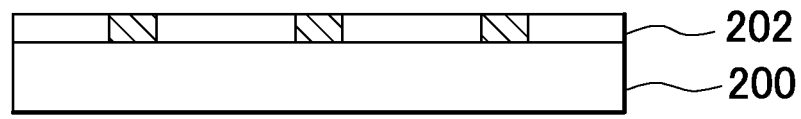
FIG. 10B shows a step in the manufacturing process of the light diffraction element.

Next, the suitably dried first orientation layer 202 is exposed to light through a proximity technique using a mask with a UV light polarization device. As shown in FIG. 10B, using the mask 500 including openings that extend in the ±x direction and are arranged in the ±y direction with a prescribed pitch, prescribed small regions 214 among the small regions 214 within the first patterns 212 are exposed to the polarized light 502 polarized in the ±y direction. In the light orienting compound in the small regions 214, the portions that are exposed to light orient the light to be parallel to the polarization direction.

Figure 10C:
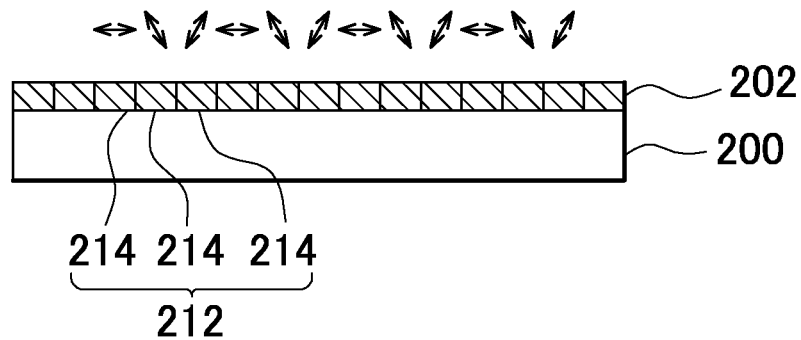
FIG. 10C shows a step in the manufacturing process of the light diffraction element.

Next, the mask 500 is shifted in the +y direction by the width of a small region 214, and the small regions 214 that are adjacent to the small regions 214 of the first patterns 212 that were exposed to light immediately before are exposed to the polarized light 502 that is rotated by 60° within the xy plane relative to the polarization direction shown in FIG. 10B. In the same manner, the mask 500 is then shifted in the +y direction by the width of a small region 214 and exposure is performed with the polarized light 502 that is rotated by 120° within the xy plane relative to the polarization direction shown in FIG. 10B. By performing this exposure, as shown by FIG. 10C, a phase diffraction grating is obtained in which orientation films are arranged in a stripe pattern and have a liquid crystal restricting force that causes adjacent small regions 214 to be sequentially rotated by 60°.

Figure 10D:
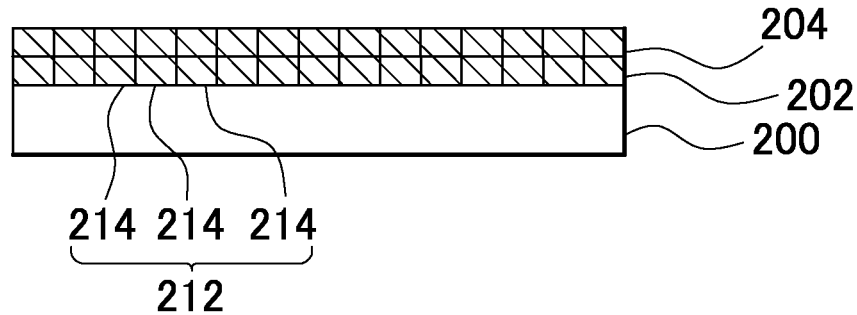
FIG. 10D shows a step in the manufacturing process of the light diffraction element.
Figure 10D:
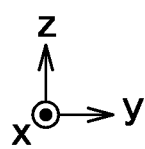

As shown by FIG. 10D, a birefringent liquid crystal composition is applied to the substrate 200 on which the first orientation layer 202 is formed, using a widely known application means such as a roller coater, a spin coater, or a slit die coater. The liquid crystal molecules in the birefringent liquid crystal composition obey the restrictive force of the first orientation layer 202, and are therefore arranged in a prescribed direction in each small region 214. After this, the birefringent liquid crystal composition is hardened using UV rays, thereby forming the first liquid crystal layer 204.

Figure 11E:
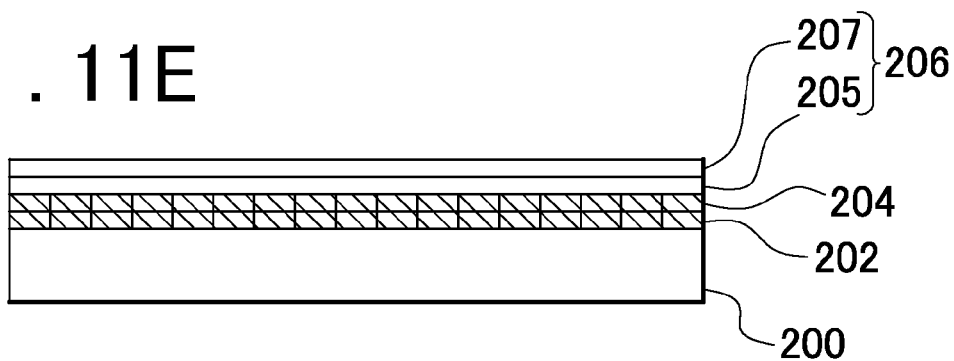
FIG. 11E shows a step in the manufacturing process of the light diffraction element.

As shown by FIG. 11E, the light orienting compound is applied to the first liquid crystal layer 204 using the same method as used for the first orientation layer 202. Furthermore, the entire application surface is exposed to linearly polarized light, thereby obtaining the orientation film 205 having a uniform orientation direction. After this, the birefringent liquid crystal composition is applied on the orientation film 205, thereby orienting the liquid crystal in the orientation direction of the orientation film 205. Next, the liquid crystal is hardened using UV rays, thereby forming the retardation layer 206 that is made of the orientation film 205 and the liquid crystal layer 207 oriented in the same direction as the orientation film 205.

Figure 11F:
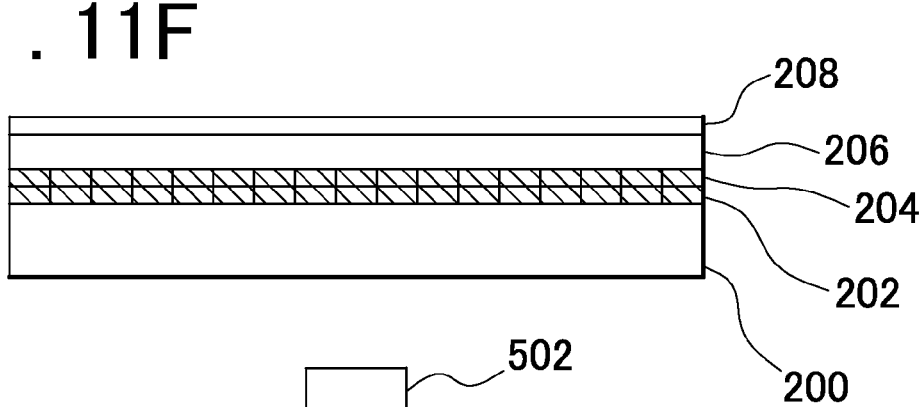
FIG. 11F shows a step in the manufacturing process of the light diffraction element.

As shown by FIG. 11F, the light orienting compound is applied to one surface of the retardation layer 206 using a widely known application means such as a roller coater, a spin coater, or a slit die coater. After this, the application surface is suitably dried to form the second orientation layer 208 on the retardation layer 206.

The second orientation layer 208 is suitably dried and exposed to light through a proximity technique using a mask with a UV light polarization device. In this case, using the mask 500 including openings that extend in the ±y direction and are arranged in the ±x direction with a prescribed pitch, prescribed small regions among the small regions within the second patterns are exposed to the polarized light polarized in the ±y direction. In the light orienting compound in the small regions, the portions that are exposed to light orient the light to be parallel to the polarization direction.

Next, in the same manner as shown in FIG. 10C, the polarization direction is rotated by 60° within the xy plane and another two of the small regions among the second patterns are exposed to light. In this way, the second orientation layer 208 having a liquid crystal restricting force that causes adjacent small regions to be sequentially rotated by 60° is formed periodically in a striped pattern.

Figure 11G:
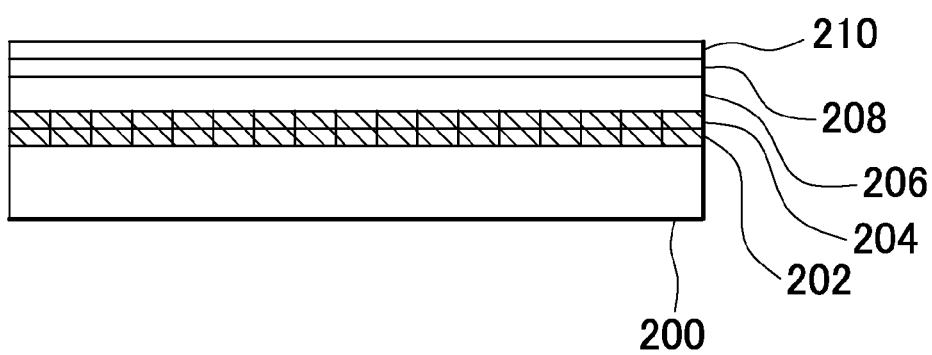
FIG. 11G shows a step in the manufacturing process of the light diffraction element.

Furthermore, as shown by FIG. 11G, a birefringent liquid crystal composition is applied on the second orientation layer 208, using a widely known application means such as a roller coater, a spin coater, or a slit die coater. The liquid crystal molecules in the birefringent liquid crystal composition obey the restrictive force of the second orientation layer 208, and are therefore arranged in a prescribed direction in each small region. After this, the birefringent liquid crystal composition is hardened using UV rays, thereby forming the second liquid crystal layer 210.

In this way, the light diffraction element 104 is manufactured that can split incident light two-dimensionally into four beams. In addition, an anti-reflection film and protective film, for example, can be formed on the second liquid crystal layer 210. In this way, internal reflection can be prevented and the transmittance can be improved. Furthermore, an infrared reflective film that reflects infrared rays having a wavelength of 800 nm or more and a short wavelength reflective film that reflects wavelengths of 400 nm or less may be provided.

In the light diffraction element 104 manufacturing method described above, the second orientation layer 208 and the first orientation layer 202 functioning as the orientation film, the first liquid crystal layer 204 and the second liquid crystal layer 210 functioning as the diffraction element, and the retardation layer 206 functioning as the ¼ wavelength plate are formed on the same substrate 200. As a result, the thickness of each layer formed by the application of liquid crystal is lower than in a case where the ¼ wavelength plate and the diffraction element are formed as separate components and then assembled. As a result, the light diffraction element can be made thinner. Furthermore, since the steps of aligning and combining the first liquid crystal layer 204 and the second liquid crystal layer 210 are unnecessary, the manufacturing process can be simplified.

Figure 12:
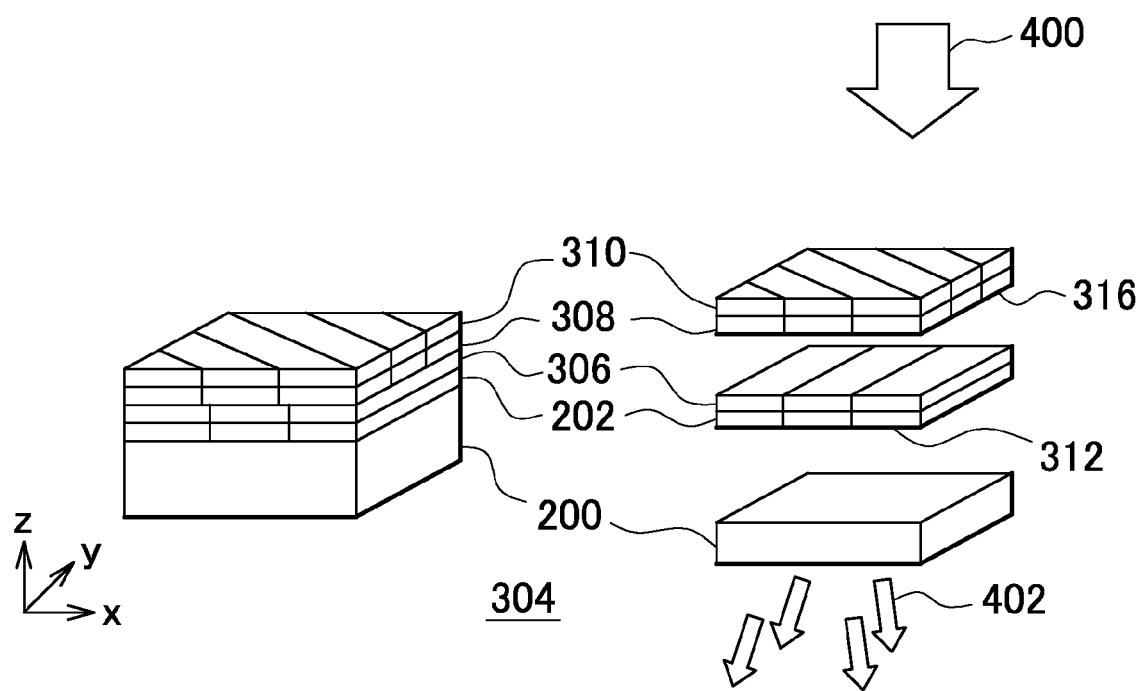
FIG. 12 is a schematic view of a fifth embodiment of the light diffraction element.

The left side of FIG. 12 is a schematic view of a fifth embodiment of the light diffraction element 304. The right side of FIG. 12 is a schematic view obtained by separating each component of the light diffraction element 304 shown on the left side into individual layers, for ease of description. The light diffraction element 304 includes a substrate 200, a first orientation layer 202, a first liquid crystal layer 306, a second orientation layer 308, and a second liquid crystal layer 310.

In this way, the light diffraction element 304 according to the fifth embodiment does not include the retardation layer 206 between the first liquid crystal layer 204 and the second orientation layer 208 as in the light diffraction element 104 according to the fourth embodiment, and the second pattern 316 of the second orientation layer 308 is arranged at an incline relative to the first pattern 312. The substrate 200 and the first orientation layer 202 are substantially the same as in the light diffraction element 104 according to the fourth embodiment, and are therefore omitted from the description.

The first liquid crystal layer 306 is oriented in the orientation direction of the first orientation layer 202 located directly therebelow. The first liquid crystal layer 306 is oriented in a pattern corresponding to the first pattern 312 of the first orientation layer 202. The pattern of the first liquid crystal layer 306 is arranged periodically in the ±x direction, which is the first direction. The total of the retardation of the first orientation layer 202 and the retardation of the first liquid crystal layer 306 is a ¼ wavelength, for example.

The second orientation layer 308 is provided on the first liquid crystal layer 306 and orients the liquid crystal of the second liquid crystal layer 310. The second orientation layer 308 includes anisotropic polymers that are the same as or different from those in the first orientation layer 202. These anisotropic polymers are arranged in a periodic pattern in the second orientation layer 308.

In the second orientation layer 308, a plurality of second patterns, which are formed by small regions defining minimum unit regions of the orientation pattern, are arranged periodically in the second direction on the primary plane of the substrate. In the embodiment shown in FIG. 12, the second direction is a direction forming an angle of 45° relative to the ±x direction in the xy plane. Accordingly, the first direction and the second direction form a 45° angle relative to each other. Instead, the first direction and the second direction may form a different angle that is greater than 0° and less than 90°.

The second pattern 316 is divided into a plurality of small regions, in the same manner as the first pattern 312 of the first orientation layer 202. The small regions in the second pattern 316 are arranged in the second direction. By setting the direction in which the small regions are lined up to be the same as the direction in which the second patterns 316 are lined up, the small regions in which the orientation direction of the polymers changes periodically are repeated periodically in the second direction. For example, the second patterns 316 may be realized by rotating the first patterns 212 shown in FIG. 3 counter-clockwise by 45° in the xy plane.

The second patterns 316 may be realized by changing the orientation direction along the second direction, in the same manner as the first patterns 212 according to the second embodiment. In this case, the second patterns 316 may be realized by rotating the first patterns 212 shown in FIG. 4 counter-clockwise by 45° in the xy plane.

The second liquid crystal layer 310 is oriented in the orientation direction of the second orientation layer 308 located directly therebelow. The second liquid crystal layer 310 is oriented in a pattern corresponding to the second pattern of the second orientation layer 308. The total of the retardation of the second orientation layer 308 and the retardation of the second liquid crystal layer 310 is a ½ wavelength, for example.

Figure 13A:
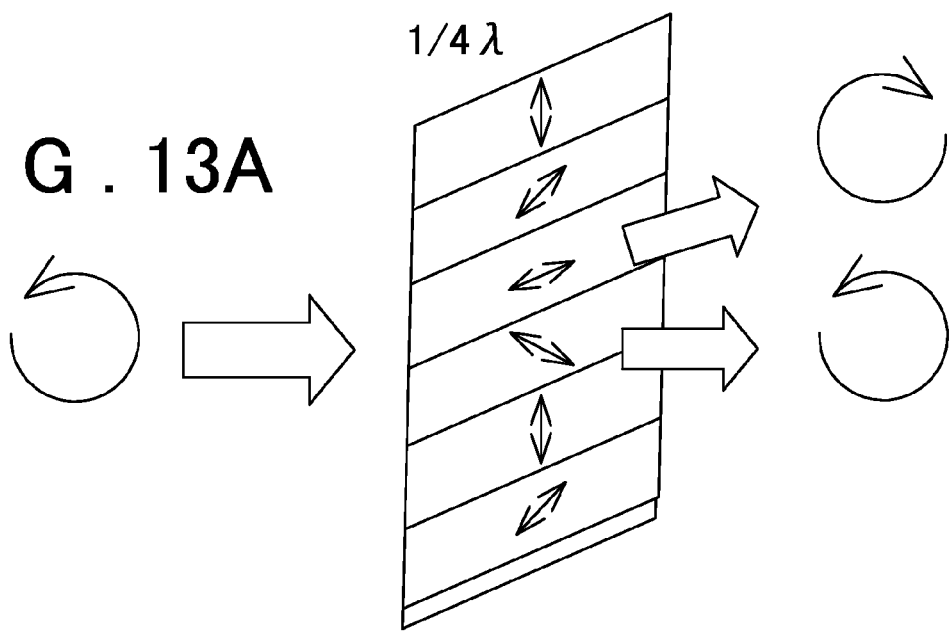
FIG. 13A shows the relationship between the diffraction direction and the polarization state of light incident to the first liquid crystal layer and the second liquid crystal layer.
Figure 13B:
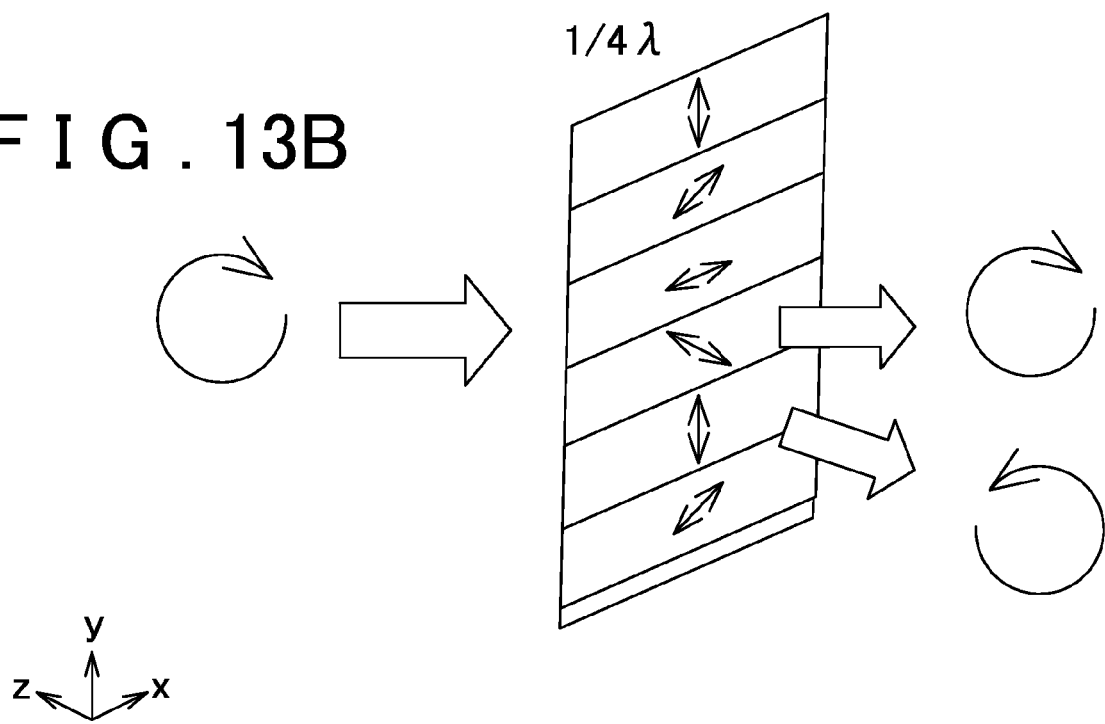
FIG. 13B shows the relationship between the diffraction direction and the polarization state of light incident to the first liquid crystal layer and the second liquid crystal layer.

FIGS. 13A and 13B show the relationship between the diffraction direction and the polarization state of light incident to the first liquid crystal layer 306, in a case where the first liquid crystal layer 306 has a ¼ wavelength retardation. As shown in FIG. 13A, the left circularly polarized light incident to the first liquid crystal layer 306 is split into left circularly polarized light that is passed without altering the rotation direction of the polarized light or the direction of the main light beam and right circularly polarized light that is diffracted in only the first direction, i.e. the −x direction in the drawing. Furthermore, as shown in FIG. 13B, the right circularly polarized light incident to the first liquid crystal layer 306 is split into the right circularly polarized light that is passed without altering the rotation direction of the polarized light or the direction of the main light beam and left circularly polarized light that is diffracted in only one direction (the +x direction) that is the opposite of the diffraction direction of the left circularly polarized light.

FIGS. 14A to 14C are schematic views of diffraction of the light incident to the light diffraction element 304 of FIG. 12. FIG. 14A shows the incident light 400 that is incident to the light diffraction element 304 of FIG. 12 from the +x direction (the direction coming from the plane of the drawing) to the −z direction (the direction going into the plane of the drawing). The incident light 400 is linearly polarized light that is polarized in the ±y direction, for example, and is a single light beam. The incident light 400 may be linearly polarized light that has another polarization direction within the xy plane. The incident light 400 is incident to the second orientation layer 308 and the second liquid crystal layer 310 of the light diffraction element 304.

FIG. 14B shows the light resulting from the incident light 400 passing through the second liquid crystal layer 310 and the second orientation layer 308. The light incident to the second liquid crystal layer 310 including a ½ wavelength phase difference is converted into circularly polarized light beams that have different polarization directions from each other and are in the second direction, i.e. directions forming a 45° angle with respect to the ±x direction in the xy plane, according to the same optical properties as described in FIG. 9. Accordingly, the incident light 400 passed through the second liquid crystal layer 210 and the second orientation layer 208 becomes circularly polarized light split into two beams in the second direction. The circularly polarized light split into two beams is incident to the first liquid crystal layer 306.

FIG. 14C shows the light resulting from the two circularly polarized beams passing through the first liquid crystal layer 306 and the first orientation layer 202. The left circularly polarized light incident to the first liquid crystal layer 306 is split into left circularly polarized light that is passed without altering the direction of the main light beam and right circularly polarized light that is diffracted in only one of the first directions, i.e. the −x direction in the drawing, as shown in FIG. 13A. Furthermore, as shown in FIG. 13B, the right circularly polarized light incident to the first liquid crystal layer 306 is split into right circularly polarized light that is passed without altering the direction of the main light beam and left circularly polarized light that is diffracted in one direction, i.e. the +x direction in the drawing, that is opposite the diffraction direction of the left circularly polarized light.

Accordingly, the left circularly polarized light incident to the first liquid crystal layer 306 is split into left circularly polarized light that progresses as-is and right circularly polarized light that is diffracted at the bottom. Furthermore, the right circularly polarized light incident to the first liquid crystal layer 306 is split into right circularly polarized light that progresses as-is and left circularly polarized light that is diffracted at the top. Accordingly, the two circularly polarized light beams incident to the first liquid crystal layer 306 and the first orientation layer 202 become circularly polarized light split into four beams that are each in the ±x direction, which is the first direction. The circularly polarized light split into four beams is output from the substrate 200.

In the present embodiment, when an angle θ is formed by the first direction, which is the pattern arrangement direction of the first liquid crystal layer 306, and the second direction, which is the pattern arrangement direction of the second liquid crystal layer 310, the width of the second patterns in the second direction may be 2cosθ times the width of the first patterns in the first direction. Since the widths of the first patterns and the second patterns are approximately inversely proportional to the distance by which the first-order diffracted light beams are separated, in this case, the light diffraction element 304 can emit diffracted light that is split into beams located at the vertices of a substantially rectangular shape.

For example, since θ is 45° in the present embodiment, the width of each small region of the second patterns in the second direction may be $2^{1/2}$ times the width of each small region in the first patterns in the first direction. In this way, the light diffraction element 304 can emit diffracted light that is split into beams located at the vertices of a substantially square shape.

In this way, the light diffraction element generates diffracted light in the ±x direction and the ±y direction by passing the incident light 400 through the second liquid crystal layer 310, the second orientation layer 308, the first liquid crystal layer 306, and the first orientation layer 202. FIG. 12 shows only the first-order diffracted light, but there can also be embodiments in which zero-order diffracted light or diffracted light of the second order or higher is generated. If the diffracted light can be created using only the first orientation layer 202 and the second orientation layer 308, there is no need to provide the first liquid crystal layer 306 or the second liquid crystal layer 310. If the diffracted light can be created using only the second orientation layer 208, there is no need to provide the second liquid crystal layer 310.

Instead of the present embodiment, an embodiment may be used in which the total of the retardation of the first orientation layer and the retardation of the first liquid crystal layer is a ½ wavelength and the total of the retardation of the second orientation layer and the retardation of the second liquid crystal layer is a ¼ wavelength.

FIRST EXPERIMENTAL EXAMPLE

The following shows an experimental example relating to the relationship between the width of adjacent small regions in the first direction in the first pattern and the first-order diffracted light efficiency of the light diffraction element.

In this experiment, the light diffraction element of the embodiment shown in FIG. 7 was considered. In other words, the light diffraction element in this example includes at least the substrate 200, the first orientation layer 202, the retardation layer 206, and the second orientation layer 208.

FIG. 15 shows the first pattern 212 of this example. The one first pattern 212 of FIG. 15 is formed by three smaller small regions 222 and three larger small regions 224 arranged in an alternating manner. The orientation direction of each small region is sequentially rotated to the left by 30° for each adjacent region, as shown by the arrows and numerical values. The total of the width (a) of the small regions 222 in the first direction and the width (10-a) of the small region 224 in the first direction is set to a constant value of (10).

The widths of the small regions included in the second pattern 216 are expressed by the ratio between a and 10-1, in the same manner as in FIG. 15. The second patterns and first patterns are the same pattern. The first orientation layer 202 and the second orientation layer 208 have a ½ wavelength retardation, and the retardation layer 206 has a ¼ wavelength retardation.

Figure 16:
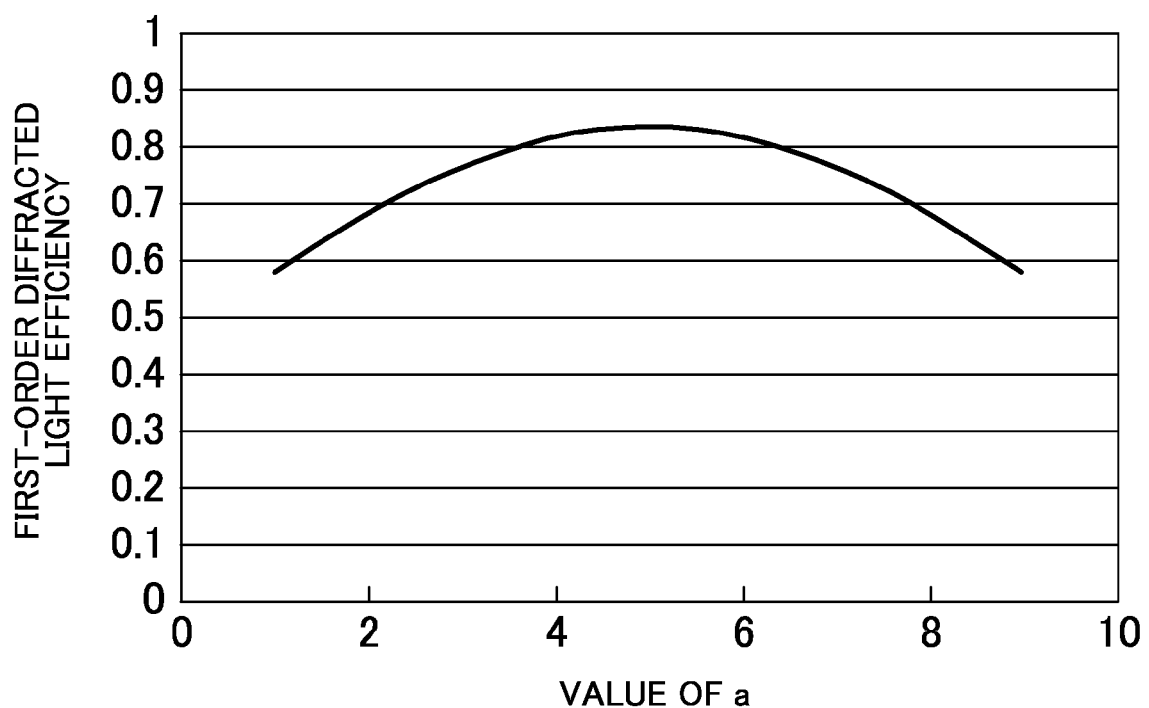
FIG. 16 is a graph showing results obtained when changing the width (a) conditions of FIG. 15.

When the experiment was performed using the above conditions, the relationship between the width (a) of the small region and the efficiency of the first-order diffracted light of the light diffraction element (the ratio of the total of the first-order diffracted light split into four beams within the total emitted light of the element) is as shown in the results of FIG. 16. The first-order diffracted light efficiency indicates the ratio of the total of the first-order diffracted light split into four beams within the total emitted light of the element.

According to FIG. 16, the first-order diffracted light efficiency is at a maximum of approximately 0.85 near a width (a) value of 5, i.e. when adjacent small regions have the same width. In this case, the widths of small regions in the first direction within the first pattern are the same as each other and the lengths of small regions in the second direction within the second pattern are also the same as each other. In order to use the light diffraction element as an actual low pass filter, first-order diffracted light efficiency of 0.7 or more is preferable, for example, and therefore it is understood from these results that the value (a) is preferably such that 2.5<a<7.5.

SECOND EXPERIMENTAL EXAMPLE

In the following, FIGS. 17 to 21 show an experiment investigating the relationship between the number of small regions provided in a single first pattern and the first-order diffracted light efficiency of the light diffraction element.

In this experiment, the light diffraction element of the embodiment shown in FIG. 7 was investigated. In other words, the light diffraction element in this example includes at least the substrate 200, the first orientation layer 202, the retardation layer 206, and the second orientation layer 208.

Here, each small region in the first orientation layer 202 has the same width, and the difference in the orientation direction of the polymers of adjacent regions is uniform. The second orientation layer 208 has the same pattern as the first orientation layer 202. The first orientation layer 202 and the second orientation layer 208 have a ½ wavelength retardation, and the retardation layer 206 has a ¼ wavelength retardation.

FIG. 17A shows an example in which one first pattern is divided into ten small regions. Specifically, the orientation direction of the polymers in the small regions are respectively 18°, 36°, 54°, 72°, 90°, 108°, 126°, 144°, 162°, and 180°.

Figure 17:
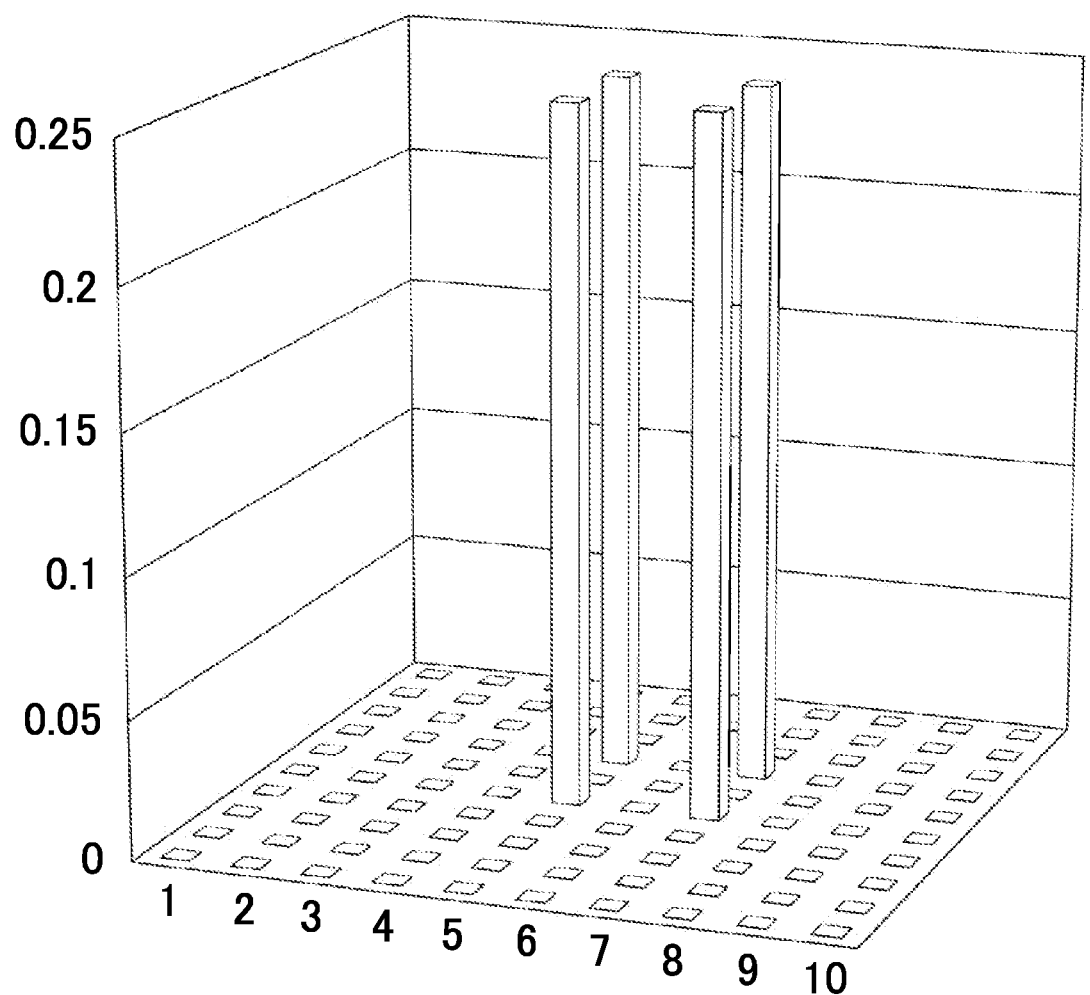
FIG. 17 is a graph showing the diffracted light intensity in a case where the first pattern is divided into ten small regions.

Upon performing the experiment with the above conditions, the first-order diffracted light efficiency of the light diffraction element was found to be 0.93. These results are shown in FIG. 17.

THIRD EXPERIMENTAL EXAMPLE

This experiment uses the same conditions as the second experimental example, except that one first pattern is divided into six small regions. Specifically, the orientation direction of the polymers in the small regions are respectively 30°, 60°, 90°, 120°, 150°, and 180°.

Figure 18:
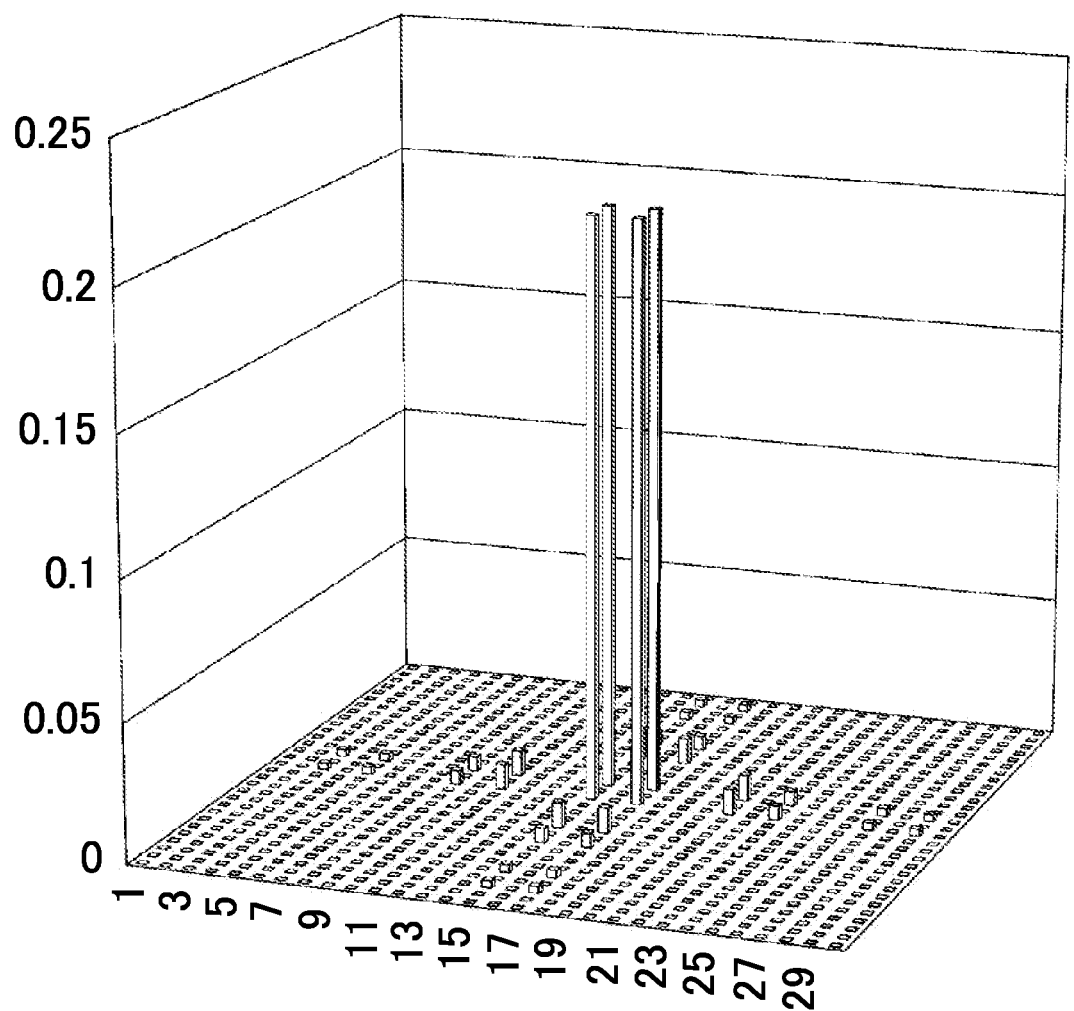
FIG. 18 is a graph showing the diffracted light intensity in a case where the first pattern is divided into six small regions.

Upon performing the experiment with the above conditions, the first-order diffracted light efficiency of the light diffraction element (the ratio of the total of the first-order diffracted light split into four beams within the total emitted light of the element) was found to be 0.83. These results are shown in FIG. 18.

FOURTH EXPERIMENTAL EXAMPLE

This experiment uses the same conditions as the second experimental example, except that one first pattern is divided into four small regions. Specifically, the orientation direction of the polymers in the small regions are respectively 45°, 90°, 135°, and 180°.

Upon performing the experiment with the above conditions, the first-order diffracted light efficiency of the light diffraction element (the ratio of the total of the first-order diffracted light split into four beams within the total emitted light of the element) was found to be 0.66. These results are shown in FIG. 19.

FIFTH EXPERIMENTAL EXAMPLE

This experiment uses the same conditions as the second experimental example, except that one first pattern is divided into three small regions. Specifically, the orientation direction of the polymers in the small regions are respectively 60°, 120°, and 180°.

Upon performing the experiment with the above conditions, the first-order diffracted light efficiency of the light diffraction element (the ratio of the total of the first-order diffracted light split into four beams within the total emitted light of the element) was found to be 0.47. These results are shown in FIG. 20.

Figure 21:
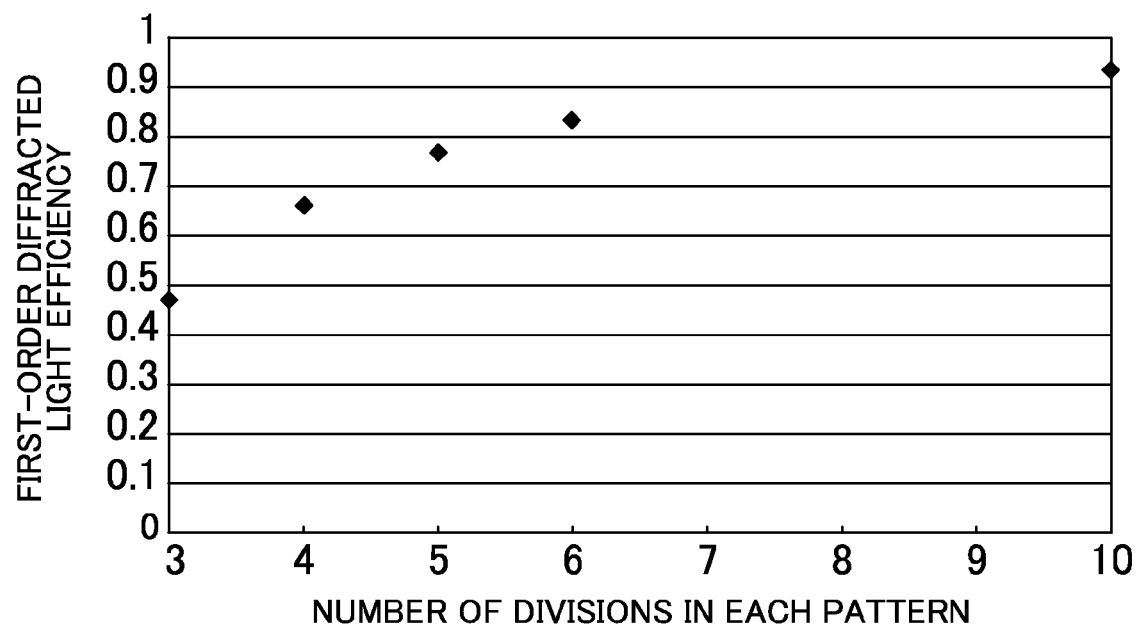
FIG. 21 is a graph showing a relationship between the number of divisions made in the first pattern and the first-order diffraction efficiency.

FIG. 21 shows the relationship between the first-order diffraction effectiveness of the light diffraction element and the number of divisions made in the first pattern. In order to use the light diffraction element as an actual low pass filter, first-order diffracted light efficiency of 0.7 or more is preferable, for example. Therefore it is understood from these results that the one first pattern is preferably divided into five or more small regions having equal widths.

SIXTH EXPERIMENTAL EXAMPLE

FIG. 22 shows an experimental example in which circularly polarized light is incident to the light diffraction element.

In this experiment, the light diffraction element of the embodiment shown in FIG. 7 was considered. In other words, the light diffraction element in this example includes at least the substrate 200, the first orientation layer 202, the retardation layer 206, and the second orientation layer 208.

Here, each small region in the first orientation layer 202 has the same width, and the difference in the orientation direction of the polymers of adjacent regions is uniform. The second orientation layer 208 has the same pattern as the first orientation layer 202. The first orientation layer 202 and the second orientation layer 208 have a ½ wavelength retardation, and the retardation layer 206 has a ¼ wavelength retardation. In the same manner as the fourth experimental example, each first pattern is divided into four regions, and the orientation direction of each small region is rotated by 45° when moving to an adjacent small region.

As shown in FIG. 22, the light diffraction element having the circularly polarized light incident thereto reduces the intensity of two of the four beams of the first-order diffracted light, and increases the intensity of the other two. This is thought to be because, for the circularly polarized light incident to the first pattern, two first-order diffracted light beams are not emitted with uniform intensity in the first direction, and one of the first-order diffracted light beams is emitted with high intensity.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A light diffraction element comprising:
    a transparent substrate;
    a first orientation layer that is formed on one surface of the substrate and includes anisotropic polymers and a first pattern of an orientation direction arranged periodically in a first direction along the primary plane of the substrate;
    a first liquid crystal layer that is provided on the first orientation layer and includes liquid crystal oriented periodically in the orientation direction of the first orientation layer;
    a second orientation layer that is formed on a top surface of the first liquid crystal layer and includes anisotropic polymers and a second pattern of an orientation direction arranged periodically in a second direction along the primary plane of the substrate; and
    a second liquid crystal layer that is provided on the second orientation layer and includes liquid crystal periodically oriented in the orientation direction of the second orientation layer, wherein
    the first pattern includes three or more small regions that are arranged in the first direction and in which the orientation direction of the polymers included in the first orientation layer are different from each other, and generates diffracted light as a result of interference between light passed respectively through the three or more small regions,
    the total of retardation of the first orientation layer and retardation of the first liquid crystal layer is a ¼ wavelength, and
    the total of retardation of the second orientation layer and retardation of the second liquid crystal layer is a ½ wavelength.

2. The light diffraction element according to claim 1, wherein
    the second pattern is formed by arranging three or more small regions, in which the orientation direction of polymers included in the second orientation layer are different from each other, in the second direction,
    the first direction and the second direction intersect,
    the incident light is diffracted in the first direction as a result of interference between light passed respectively through the first orientation layer and the first liquid crystal layer, and
    the incident light is diffracted in the second direction as a result of interference between light passed respectively through the second orientation layer and the second liquid crystal layer.

3. The light diffraction element according to claim 2, wherein
    a ¼ wavelength retardation layer is provided between the first liquid crystal layer and the second orientation layer.

4. The light diffraction element according to claim 3, wherein
    the first direction and the second direction are orthogonal.

5. The light diffraction element according to claim 3, wherein
    width of the first pattern in the first direction is equal to width of the second pattern in the second direction.

6. The light diffraction element according to claim 2, wherein
    the second orientation layer is a hardened light orienting compound.

7. The light diffraction element according to claim 2, wherein
    widths of the small regions of the second pattern in the second direction are the same as each other.

8. The light diffraction element according to claim 2, wherein
    the second pattern includes a stripe pattern in which the small regions are arranged in the second direction.

9. The light diffraction element according to claim 1, comprising:
    wherein
    the second pattern is formed such that the orientation direction changes when moving in the second direction,
    the first direction and the second direction intersect,
    the incident light is diffracted in the first direction as a result of interference between light passed respectively through the first orientation layer and the first liquid crystal layer, and
    the incident light is diffracted in the second direction as a result of interference between light passed respectively through the second orientation layer and the second liquid crystal layer.

10. The light diffraction element according to claim 1, wherein
    the first direction and the second direction form an angle of 45°.

11. The light diffraction element according to claim 10, wherein width of the second pattern in the second direction is $2^{1/2}$ times width of the first pattern in the first direction.

12. An optical low pass filter using the light diffraction element according to claim 1.

13. A light diffraction element comprising:
a transparent substrate;
a first orientation layer that is formed on one surface of the substrate and includes anisotropic polymers and a first pattern of an orientation direction arranged periodically in a first direction along the primary plane of the substrate;
a first liquid crystal layer that is provided on the first orientation layer and includes liquid crystal oriented periodically in the orientation direction of the first orientation layer;
a second orientation layer that is formed on a top surface of the first liquid crystal layer and includes anisotropic polymers and a second pattern of an orientation direction arranged periodically in a second direction along the primary plane of the substrate; and
a second liquid crystal layer that is provided on the second orientation layer and includes liquid crystal periodically oriented in the orientation direction of the second orientation layer, wherein
the first pattern includes three or more small regions that are arranged in the first direction and in which the orientation direction of the polymers included in the first orientation layer are different from each other, and generates diffracted light as a result of interference between light passed respectively through the three or more small regions,
the total of retardation of the first orientation layer and retardation of the first liquid crystal layer is a ½ wavelength, and
the total of retardation of the second orientation layer and retardation of the second liquid crystal layer is a ¼ wavelength.

14. The light diffraction element according to claim 13, wherein
the second pattern is formed by arranging three or more small regions, in which the orientation direction of polymers included in the second orientation layer are different from each other, in the second direction,
the first direction and the second direction intersect,
the incident light is diffracted in the first direction as a result of interference between light passed respectively through the first orientation layer and the first liquid crystal layer, and
the incident light is diffracted in the second direction as a result of interference between light passed respectively through the second orientation layer and the second liquid crystal layer.

15. A light diffraction element comprising:
a transparent substrate;
a first orientation layer that is formed on one surface of the substrate and includes anisotropic polymers and a first pattern of an orientation direction arranged periodically in a first direction along the primary plane of the substrate;
a first liquid crystal layer that is provided on the first orientation layer and includes liquid crystal oriented periodically in the orientation direction of the first orientation layer;
a second orientation layer that is formed on a top surface of the first liquid crystal layer and includes anisotropic polymers and a second pattern of an orientation direction arranged periodically in a second direction along the primary plane of the substrate; and
a second liquid crystal layer that is provided on the second orientation layer and includes liquid crystal periodically oriented in the orientation direction of the second orientation layer, wherein
the first pattern is formed to have an orientation direction that changes while moving in the first direction, and generates diffracted light as a result of interference between light passed through the first pattern,
the total of retardation of the first orientation layer and retardation of the first liquid crystal layer is a ¼ wavelength, and
the total of retardation of the second orientation layer and retardation of the second liquid crystal layer is a ½ wavelength.

16. The light diffraction element according to claim 15, wherein
the second pattern is formed such that the orientation direction changes when moving in the second direction,
the first direction and the second direction intersect,
the incident light is diffracted in the first direction as a result of interference between light passed respectively through the first orientation layer and the first liquid crystal layer, and
the incident light is diffracted in the second direction as a result of interference
between light passed respectively through the second orientation layer and the
second liquid crystal layer.

17. The light diffraction element according to claim 16, wherein
the first direction and the second direction are orthogonal.

18. The light diffraction element according to claim 16, wherein
the second orientation layer is a hardened light orienting compound.

19. The light diffraction element according to claim 16, wherein
a ¼ wavelength retardation layer is provided between the first liquid crystal layer and the second orientation layer.

20. The light diffraction element according to claim 19, wherein
width of the first pattern in the first direction is equal to width of the second pattern in the second direction.

21. The light diffraction element according to claim 15, wherein
the first direction and the second direction form an angle of 45°.

22. The light diffraction element according to claim 21, wherein
width of the second pattern in the second direction is $2^{1/2}$ times width of the first pattern in the first direction.

23. An optical low pass filter using the light diffraction element according to claim 15.

24. A light diffraction element comprising:
a transparent substrate;
a first orientation layer that is formed on one surface of the substrate and includes anisotropic polymers and a first pattern of an orientation direction arranged periodically in a first direction along the primary plane of the substrate;
a first liquid crystal layer that is provided on the first orientation layer and includes liquid crystal oriented periodically in the orientation direction of the first orientation layer;

a second orientation layer that is formed on a top surface of the first liquid crystal layer and includes anisotropic polymers and a second pattern of an orientation direction arranged periodically in a second direction along the primary plane of the substrate; and a second liquid crystal layer that is provided on the second orientation layer and includes liquid crystal periodically oriented in the orientation direction of the second orientation layer, wherein the first pattern is formed to have an orientation direction that changes while moving in the first direction, and generates diffracted light as a result of interference between light passed through the first pattern, the total of retardation of the first orientation layer and retardation of the first liquid crystal layer is a ½ wavelength, and the total of retardation of the second orientation layer and retardation of the second liquid crystal layer is a ¼ wavelength.

25. The light diffraction element according to claim 24, wherein the second pattern is formed such that the orientation direction changes when moving in the second direction, the first direction and the second direction intersect, the incident light is diffracted in the first direction as a result of interference between light passed respectively through the first orientation layer and the first liquid crystal layer, and the incident light is diffracted in the second direction as a result of interference between light passed respectively through the second orientation layer and the second liquid crystal layer.

* * * * *